(12) United States Patent
Okutu et al.

(10) Patent No.: US 6,232,054 B1
(45) Date of Patent: May 15, 2001

(54) POLYESTER SUPPORT AND SILVER HALIDE PHOTOGRAPHIC LIGHT-SENSITIVE MATERIAL

(75) Inventors: Toshimitu Okutu; Kiyokazu Hashimoto, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/650,735

(22) Filed: Aug. 30, 2000

(30) Foreign Application Priority Data

| Sep. 19, 1999 | (JP) | ................................................ 11-265771 |
| Sep. 19, 1999 | (JP) | ................................................ 11-277013 |
| Oct. 19, 1999 | (JP) | ................................................ 11-288903 |
| Oct. 19, 1999 | (JP) | ................................................ 11-288906 |

(51) Int. Cl.$^7$ .......................... G03C 1/795; B32B 27/06; B32B 27/36; B32B 3/00

(52) U.S. Cl. ........................... 430/501; 430/533; 428/480

(58) Field of Search ..................................... 430/533, 501; 428/480

(56) References Cited

U.S. PATENT DOCUMENTS

| 5,294,473 | * | 3/1994 | Kawamoto | ............................ 430/533 |
| 5,629,141 | * | 5/1997 | Kawamoto | ............................ 430/533 |
| 6,060,226 | * | 5/2000 | Hashimoto | ............................ 430/533 |
| 6,124,043 | * | 9/2000 | Tsukamoto et al. | ................. 430/533 |

* cited by examiner

*Primary Examiner*—Richard L. Schilling
(74) *Attorney, Agent, or Firm*—Sughrue, Mion, Zinn, Macpeak & Seas, PLLC

(57) ABSTRACT

A polyester support is described, which has a tear strength in the transverse direction (TD) of 10 to 100 g, a break strength in TD of 10 to 40 Kg/mm$^2$, a break strength in the machine direction (MD) of 2 to 25 Kg/mm$^2$ and a thickness unevenness in MD of 0 to 8 μm. Also described is a silver halide photographic light-sensitive material using the support.

13 Claims, No Drawings

POLYESTER SUPPORT AND SILVER HALIDE PHOTOGRAPHIC LIGHT-SENSITIVE MATERIAL

FIELD OF THE INVENTION

The present invention relates to a polyester support having excellent cutting property, particularly a polyethylene naphthalate-type support, and also relates to a silver halide photographic light-sensitive material using the support.

BACKGROUND OF THE INVENTION

Silver halide photographic light-sensitive materials (hereinafter sometimes referred to as a "light-sensitive material") using a polyester support are described in JP-A-6-035118 (the term "JP-A" as used herein means an "unexamined published Japanese patent application"), JP-A-11-202445, JP-A-11-202446 and the like. However, using such a light-sensitive material, when a brownie or 135 light-sensitive material was manufactured and subjected to a series of processing at a processing laboratory (lab) cutting failure occurred with use of a cutter fixed to a mini-lab, a splicer or a mounter for reversal. This is attributable to the fact that the cutter is fitted to conventional TAC (triacetyl cellulose) supports which are very easy to cut, and therefore, encounters difficulty in cutting a polyester support having high mechanical strength and poor cuttability.

With an attempt to solve this problem, JP-A-10-293381 discloses a method of anisotropically stretching the polyester support (2 times or less in MD and from 2.5 to 6 times in TD). Nevertheless, the cutting failure still occurs, moreover, the polyester support cannot be cut straight in TD and cutting eats even into the image. These problems are generated particularly when the core set curl is strong.

SUMMARY OF THE INVENTION

The object of the present invention is to provide a polyester support having excellent cutting property and a silver halide photographic light-sensitive material using the support.

The object of the present invention can be attained by (1) to (13) below.

(1) A polyester support having a tear strength in the transverse direction (TD) of 10 to 100 g, a break strength in TD of 10 to 40 Kg/mm$^2$, a break strength in the machine direction (MD) of 2 to 25 Kg/mm$^2$ and a thickness unevenness in MD of 0 to 8 μm.

(2) The polyester support as described in (1), wherein the elongation at break in TD is from 20 to 140% and the elongation at break in MD is from 10 to 180%.

(3) The polyester support as described in (1), wherein the tear strength ratio between MD and TD (MD/TD) is from 1.2 to 10.

(4) The polyester support as described in (1) or (2), wherein the core set curl in MD is from 30 to 140 m$^{-1}$.

(5) The polyester support as described in (1), wherein the thickness unevenness in TD is from 0 to 8 μm.

(6) The polyester support as described in (1), wherein the generation ratio of delamination is from 0 to 75% each in TD and MD.

(7) The polyester support as described in (1), wherein the ratio of modulus between TD and MD (MD/TD) is from 1.2 to 6.

(8) The polyester support as described in (1), wherein the ratio of elongation at break between MD and TD (TD/MD) is from 1.2 to 10.

(9) The polyester support as described in any one of (1) to (4), wherein the total light transmittance is from 70 to 98%, the haze is from 0 to 2% and the thickness is from 90 to 150 μm.

(10) The polyester support as described in any one of (1) to (9), which consists of a dicarboxylic acid residue comprising from 65 to 95 mol % of a naphthalene dicarboxylic acid residue and from 5 to 35 mol % of an aliphatic and/or aromatic dicarboxylic acid residue having from 3 to 15 carbon atoms, and a diol residue comprising from 65 to 100 mol % of an ethylene crlycol residue and from 0 to 35 mol % of a HO—$\{(CH_2)_nO\}_m$—H (wherein n is an integer of 3 to 6 and m is an integer of 2 to 30) and/or H—(OCH$_2$CH$_2$)n—O—B—R—B—O(CH$_2$CH$_2$O)$_m$—H (wherein n and m, which may be the same or different, each is an integer of 1 to 3, R represents —O—, —S—, —CH$_2$— or —C(CH$_3$)$_2$—, and B represents a benzene ring) residue.

(11) The polyester support as described in any one of (1) to (10), which is sequentially stretched in MD to from 1.0 to 3.0 times and in TD to from 3.0 to 5.0 times and then heat set to have a heat of crystal fusion of 30 to 60 J/g.

(12) The polyester support as described in any one of (1) to (11), which is heat-treated at a temperature in the range from 50° C. to the glass transition temperature (Tg) of the polyester.

(13) A rolled silver halide photographic light-sensitive material using the support of (1) to (12) and wound along MD.

DETAILED DESCRIPTION OF THE INVENTION

The present invention provides a polyester-type support which is rendered easy to cut by imparting it specific break strength in addition to tearing property. In the present invent-Lon, the tear strength in TD is preferably from 10 to 100 g, more preferably from 20 to 80 g, still more preferably from 20 to 60 g. The ratio of tear strength between the machine direction and the transverse direction (MD/TD) is from 1.2 to 10, preferably from 1.5 to 8, still more preferably from 1.7 to 6, whereby the cutting property is improved.

The break strength in TD is preferably set to an appropriate strength range. If the strength is too low, the support may be cut during the transportation within a camera, whereas if it is too high, cutting failure may occur at the lab. Accordingly, the break strength is from 10 to 40 Kg/mm$^2$, more preferably from 15 to 35 Kg/mm$^2$. With this break strength, the elongation at break is preferably from 20 to 140%, more preferably from 30 to 110%, still more preferably from 40 to 90%. The ratio of the elongation at break (MD/TD) is preferably from 1.2 to 5, more preferably from 1.2 to 4, still more preferably from 1.2 to 3.

The break strength in MD is preferably from 2 to 25 Kg/mm$^2$, more preferably from 4 to 20 Kg/mm$^2$, still more preferably from 7 to 18 Kg/mm$^2$.

With this break strength, the elongation at break is preferably from 10 to 180%, more preferably from 20 to 140%, still more preferably from 30 to 90%. The core set curl in MD is from 30 to 140 m$^{-1}$, more preferably from 40 to 130 m$^{-1}$, still more preferably from 50 to 120 m$^{-1}$, so that the light-sensitive material can be prevented from sliding below the cutter blade to cause cutting failure.

The thickness unevenness in MD is from 0 to 8 μm, more preferably from 0 to 6 μm, still more preferably from 0 to 5 μm, whereby the linearity at the cutting can be improved. The thickness unevenness in TD is from 0 to 8 μm, more preferably from 0 to 6 μm, still more preferably from 0 to 5 μm, whereby the linear cutting property can be more improved.

The polyester support preferably has a total light transmittance of 70 to 98%, more preferably from 80 to 96%, still more preferably from 86 to 95%. The haze is preferably from 0 to 2%, more preferably from 0 to 1.5%, still more preferably from 0 to 1%.

In the polyester support, the generation ratio of delamination is from 0 to 75% in both MD and TD, more preferably from 0 to 60%, still more preferably from 0 to 50%.

The ratio of modulus between TD and MD (TD/MD) is preferably from 1.5 to 6, more preferably from 1.8 to 5, still more preferably from 1.6 to 4.

The support satisfying these conditions can be achieved as follows.

The polyester support is constructed by raw materials of a dicarboxylic acid and a diol. In the polyester support of the present invention, the dicarboxylic acid comprises a 2,6-naphthalenedicarboxylic acid component in an amount of 65 to 95 mol %, preferably from 70 to 95 mol %, and as another copolymerization dicarboxylic acid component other than the 2,6-naphthalenedicarboxylic acid, an aliphatic and/or aromatic dicarboxylic acid component having from 3 to 15 carbon atoms in an amount of 5 to 35 mol %, preferably from 5 to 30 mol %. Preferred examples of the dicarboxylic acid component other than 2,6-naphthalenedicarboxylic acid include ester formation products of adipic acid (AA), terephthalic acid (TPA), isophthalic acid (IPA), (1,5-, 1,4-, 2,7-) naphthalenedicarboxylic acid (NDCA) and paraphenylenedicarboxylic acid (PPDC).

The diol component comprises an ethylene glycol (EG) component in an amount of 65 to 100 mol %, preferably from 70 to 100 mol %, and a copolymerization component other than the ethylene glycol, in an amount of 0 to 35 mol %, preferably from 0 to 30 mol %. Preferred examples of the diol component other than ethylene glycol include trimethylene glycol (TMG), neopentyl glycol (NPG), hexamethylene glycol (HMG), cyclohexadimethanol (CHDM) and compounds represented by the formula: H—$(OCH_2CH_2)_n$—O—B—R—B—O—$(CH_2CH_2O)_m$—H (wherein m and n, which may be the same or different, each is an integer of 1 to 3, R represents —S—, —O—, —$CH_2$— or —$C(CH_3)_2$—, and B represents a benzene ring). Among the compounds represented by the formula, an ethylene oxide adduct of bisphenol A (in the formula, n is 1 and m is 2, hereinafter simply referred to as BPA·3EO) is more preferred.

Also, a hydroxycarboxylic acid such as hydroxybenzoic acid (PHBA) may be used.

The polyester support may be a copolymer of the above-described compounds or may be a polymer blend thereof.

Such polyester can be obtained as follows. A dicarboxylic acid diester (usually dimethyl ester form) and a diol as raw materials are reacted in the presence of an ester exchange reaction catalyst at an atmospheric pressure under heating at 150 to 250° C. for 2 to 5 hours while distilling off the by-product methanol. Thereafter, the reaction product is polycondensated at a temperature of 250 to 290° C. for 2 to 4 hours while gradually elevating the vacuum degree from atmospheric pressure to 0.3 torr. As a result, polyester having an intrinsic viscosity (measured using an orthochlorophenol solvent at 35° C.) of 0.45 to 0.7, preferably from 0.5 to 0.68, can be obtained. The synthesis methods of polyester, including the above-described method, are described, for example, in Kobunshi Jikken Gaku Dai 5-Kan, "Jushukugo to Jufuka" (Study of Polymer Experimentation Vol. 5, "Polycondensation and Polyaddition"), pp. 103–136, Kyoritsu Shuppan (1980), Gosei Kobunshi V (Synthetic Polymer V), pp. 187–286, Asakura Shoten (1971), JP-A-5-163337, JP-A-3-179052, JP-A-2-3420 and JP-A-1-275628.

Specific preferred examples of the polyester for use in the present invention include the following compounds, however, the present invention is not limited thereto.

Examples of Homopolymer:
HP-1: polyethylene-2,6-naphthalate (PEN) Tg=120° C.

Examples of Copolyme: (numerals in parentheses show the molar ratio)

|  | TG (° C.) | Composition (by mol) |
|---|---|---|
| CP-1: 2,6-NDCA/TPA/EG | 105 | (80/20/100) |
| CP-2: 2,6-NDCA/IPA/EG | 100 | (80/20/100) |
| CP-3: 2,6-NDCA/AA/EG/BPA.2EO | 115 | (95/5/90/10) |
| CP-4: 2,6-NDCA/AA/EG/BPA.2EO | 95 | (80/20/90/10) |
| CP-5: 2,6-NDCA/TPA/EG/NPG | 110 | (90/10/90/10) |
| CP-6: 2,6-NDCA/IPA/EG/BPA.2EO | 90 | (90/10/90/10) |
| CP-7: 2,6-NDCA/IPA/EG/HMG | 105 | (90/10/95/5) |
| CP-8: 2,6-NDCA/AA/EG | 110 | (95/5/100) |
| CP-9: 2,6-NDCA/AA/EG | 95 | (80/20/100) |
| CP-10: 2,6-NDCA/AA/EG | 90 | (70/30/100) |
| CP-11: 2,6-NDCA/AA/HO$(CH_2CH_2O)_{80}$H/EG | 90 | (90/10/10/90) |
| CP-12: 2,6-NDCA/TPA/EG | 85 | (80/20/100) |
| CP-13: 2,6-NDCA/TPA/EG/BPA.2EO | 80 | (50/50/75/25) |
| CP-14: 2,6-NDCA/EG/BPA.2EO | 145 | (100/25/75) |
| CP-15: 2,6-NDCA/EG/CHDM/BPA.2EO | 135 | (100/25/25/50) |
| CP-16: 2,6-NDCA/AA/EG/CHDM | 125 | (90/10/90/10) |
| CP-17: 2,6-NDCA/EG/CHDM | 130 | (100/80/20) |
| CP-18: 2,6-NDCA/IPA/HO$(CH_2CH_2O)_{80}$H/EG | 105 | (95/5/10/90) |
| CP-19: 2,6-NDCA/HO$(CH_2CH_2O)_{160}$H/EG | 90 | (100/15/85) |
| CP-20: 2,6-NDCA/HO$(CH_2CH_2O)_{20}$H/EG | 105 | (100/20/80) |
| CP-21: 2,6-NDCA/AA/EG/HO$(CH_2)_{40}$H | 110 | (90/10/90/10) |

Examples of Polymer Blend

|  | Tg (° C.) | Composition (by weight) |
|---|---|---|
| PB-1: PEN/PET | 105 | (80/20) |
| PB-2: PEN/CP-4 | 110 | (70/30) |
| PB-3: PEN/CP-8 | 115 | (90/10) |
| PB-4: PEN/CP-15 | 125 | (85/15) |
| PB-5: PAr/PEN | 150 | (15/85) |
| PB-6: PAr/PCT/PEN | 140 | (15/10/75) |
| PB-7: PAr/PC/PEN | 135 | (10/10/80) |
| PB-8: PEN/CP-4 | 110 | (50/50) |

The above-mentioned abbreviations "PEN", "PET", "PAr", "PCT" and "PC" represent "poly (ethylene naphthalate)", "poly(ethylene terephthalate)", "polyarylate", "poly(cyclohexane dimethanol terephthalate)" and "polycarbonate", respectively.

In the present invention, two or more of these polyesters varied in the intrinsic viscosity are preferably used in combination. The difference of the intrinsic viscosity is preferably from 0.1 to 0.5, more preferably from 0.15 to 0.4, still more preferably from 0.2 to 0.35.

The polyesters used in combination may be the same or different, but at least one is preferably PEN and in a more preferred embodiment, both are PEN.

The intrinsic viscosity of the polyester having a higher intrinsic viscosity is preferably from 0.3 to 0.7, more preferably from 0.35 to 0.66, still more preferably from 0.40 to 0.62. The intrinsic viscosity of the polyester having a lower intrinsic viscosity is preferably from 0.2 to 0.6, more preferably from 0.25 to 0.56, still more preferably from 0.30 to 0.52.

The content (weight ratio) of the polyester having a lower intrinsic viscosity is preferably from 5 to 45%, more preferably from 10 to 40%, still more preferably from 15 to 35%.

During or after the polymerization, a dye or a filler is preferably added.

The dye is preferably an anthraquinone-type dye having good thermal decomposability and examples thereof include those described in Japanese Patent Application No. 6-265180 (corresponding to JP-A-8-122970). The dye is preferably added in a concentration such that the light transmittance of 400 to 700 nm is reduced by 1 to 10% after the film formation in a thickness of 100 μm. The filler may be either an organic fine particle or an inorganic fine particle, however, in view of the heat resistance, an inorganic fine particle is preferred. Examples thereof include silica, alumina, calcium carbonate, barium sulfate, titania and mica. The particle size is preferably from 0.1 to 2 μm. The shape may be any of amorphous, plate or spherical forms. A mixture of two or more kinds of particles may also be used. The amount added is from 10 to 300 ppm.

The film formation method of the polyester support is described below.

The polymer polymerized by the above-described method is pelletized and dried at 80 to 200° C. for one hour or more. Thereafter, the pellets are melted at a temperature in the range from the melting point of the polymer to 320° C. This is operated using a single or multiple screw kneading extruder. In the present invention, two or more units connected in tandem are preferably used and two units of single screw kneading extruders connected in tandem are more preferably used. Thereafter, the molten polymer is preferably filtered through a filter. Examples of the filter include screen, sintered screen, sintered metal, sand and glass fiber. The polymer is melt-extruded from a T-die to form an unstretched film. In the case of blending two or more polymers, use of a multiple screw kneading extruder is usually preferred. The molten polymer extruded from the T-die is spread on a casting drum adjusted to a temperature of 25 to 100° C. At this time, the adhesion to the drum is preferably increased by an electrostatic charging method (ion. pinning) or a liquid film formation method (where a fluid such as water is applied onto the casting drum to improve the adhesion between the melt and the drum) to improve the planeness. By stripping off the thus obtained sheet, an unstretched sheet is formed.

In the present invention, the film is stretched at a higher magnification in the transverse direction (TD) and the stretching magnification is preferably from 2.5 to 6.0, more preferably from 3.0 to 5.5, still more preferably from 3.0 to 5.0. The stretching may be performed at once but the stretching is preferably performed in parts through multiple stages. More specifically, the film is stretched at the first stage, then held as it is for a predetermined time and again stretched. This is repeated. The number of stretching stages is preferably from 1 to 10, more preferably from 2 to 7, still more preferably from 2 to 4. In the case of multi-stage stretching, the product of all stretching magnifications preferably falls within the above-described range. Also, the stretching is preferably performed by varying the magnification at respective stages. The absolute value of the difference between adjacent stretching magnifications is from 0.1 to 4.5, more preferably from 0.2 to 3.5 times, still more preferably from 0.3 to 2.5 times.

The stretching in the machine direction (MD) is from 1.0 to 3.0, preferably from 1.2 to 2.5. The stretching may be performed at once but may be performed in parts through multiple stages. The stretching is preferably performed by one stage or through two stages according to the stretching magnification. It is also preferred to re-stretch the film in MD after the TD stretching.

More specifically, (1) the film may be stretched sequentially in MD and then in TD, (2) may be stretched sequentially in TD and then in MD or (3) may be stretched in MD, in TD and again in MD. Also, the film may be simultaneously stretched in MD and TD.

The stretching temperature is preferably from 110 to 160° C., more preferably from 120 to 155° C., still more preferably from 135 to 150° C. At this time, the temperature is preferably differentiated in the transverse direction of the support. More specifically, the average temperature at respective edges in the width of 1/10 is preferably set to from 1 to 10° C. lower, more preferably from 2 to 8° C. lower, still more preferably from 3 to 7° C. lower, then the temperature at the center part. In the present invention, for achieving the elongation at break in TD of 20 to 140%, the film is preferably pre-heated before the TD stretching at a high magnification and while keeping the film in the heated state (namely, without cooling the film), stretched in TD.

The preheating is preferably performed at a temperature of 110 to 150° C., more preferably from 112 to 145° C., still more preferably from 115 to 145° C., for from 1 second to 3 minutes, more preferably from 3 seconds to 2 minutes and 30 seconds, still more preferably from 5 seconds to 2 minutes.

Subsequently to the TD stretching, the film is preferably subjected to an after heat treatment.

The after heat treatment is preferably performed at a temperature of 125 to 200° C., more preferably from 130 to 190° C., still more preferably from 135 to 180° C., for from 1 to 120 seconds, more preferably from 3 to 90 seconds, still more preferably from 5 to 60 seconds.

This after heat treatment is preferably performed while grasping both edges by chucks or the like. The grasping interval is preferably reduced by 0 to 10%, more preferably from 0 to 8%, still more preferably from 0 to 6%, so as to relax the film.

After the stretching in both directions, the film is heat set. The heat-setting temperature is preferably from 210 to 265° C., more preferably from 220 to 260° C., still more preferably from 230 to 255° C., and the treating time is preferably from 5 to 180 seconds, more preferably from 10 to 120 seconds, still more preferably from 15 to 60 seconds. The heat-setting is preferably performed while grasping both edges of the support by chucks.

Subsequently thereto, the film is heat relaxed. The heat-relaxation is preferably performed at a temperature 1 to 30° C. lower, more preferably from 2 to 20° C. lower, still more preferably from 3 to 10° C. lower, than the heat-setting temperature. The relaxation in the transverse direction is preferably from 1 to 10%, more preferably from 1 to 8%, still more preferably from 2 to 6%.

The thus-obtained support is a polyester support having a heat of crystal fusion of 30 to 60 J/g, preferably from 40 to 55 J/g, between 200° C. and 290° C.

After the heat-setting and heat-relaxation, the film is preferably subjected to gradual cooling so as to release the residual distortion. The cooling rate is preferably from −5° C./sec to −50° C./sec, more preferably from −7° C./sec to −40° C./sec, still more preferably from −10° C./sec to −35° C./sec.

Thereafter, the film is subjected to trimming of both edges and then taken up around a roll. At this time, it is also preferred to apply knurling to the edges of the support. The film formed preferably has a width of 0.5 to 10 m, more preferably from 0.8 to 8 m, still more preferably from 1 to 6 m. The thickness is preferably from 90 to 150 µm, more preferably from 100 to 140 µm, still more preferably from 100 to 130 µm.

The support obtained by this film formation is preferably heat treated at a temperature in the range from 50° C. to Tg, more preferably from 70° C. to Tg (hereinafter sometimes simply referred to as a "BTA treatment"). The BTA treatment time is preferably from 0.1 to 500 hours, more preferably from 0.3 to 400 hours, still more preferably from 0.5 to 150 hours.

The BTA treatment may be performed at a constant temperature (constant temperature BTA method) or may be performed while gradually cooling the support from a temperature higher than Tg (gradually cooling BTA method). In the latter case the average cooling rate is from −0.001° C./min to −100° C./min, more preferably from −0.001° C./min to −10° C./min, still more preferably from −0.001° C./min to −1° C./min. These methods may also be preferably used in combination.

By virtue of this BTA treatment, an endothermic peak having a maximum value between 100° C. and 170° C. can be attained. The calories of the endothermic peak is preferably from 0.5 to 5 J/g, more preferably from 0.8 to 4 J/g, still more preferably from 0.8 to 2.5 J/g.

Such a heat treatment is preferably applied to the support after the film formation, after the surface treatment which is described later, or after the coating of an electrically conductive layer, an undercoat layer and a back layer.

On the polyethylene naphthalate-type support prepared as above, a light-sensitive layer and a back layer are provided by coating. However, before the coating, the support is preferably surface treated to ensure good adhesion. Examples of the surface treatment include chemical treatment, mechanical treatment, corona discharge treatment, flame treatment, ultraviolet ray treatment, high frequency treatment, glow discharge treatment, activated plasma treatment, laser treatment, mixed acid treatment and ozone oxidation treatment. Among these, corona discharge treatment, ultraviolet ray treatment, glow discharge treatment and flame treatment are more effective, and glow discharge treatment is still more effective.

On the support of the present invention, an antistatic layer is preferably provided. The antistatic agent used to this purpose is not particularly limited and either an electrically conductive antistatic agent or a compound having a function of regulating the series of electrification may be used.

Examples of the electrically conductive antistatic agent include metal oxides and ionic compounds. The electrically conductive antistatic agent preferably used in the present invention is an antistatic agent which does not lose the antistatic effect even after the development processing and examples thereof include electrically conductive metal oxides and derivatives thereof, electrically conductive metals, carbon fiber, and π-conjugated system polymers (e.g., polyarylenevinylene). Among these, the particularly preferred electrically conductive material is a crystalline metal oxide particle.

Most preferred examples of the electrically conductive metal oxide particle include a fine particle of at least one crystalline metal oxide selected from ZnO, $TiO_2$, $SnO_2$, $Al_2O_3$, $In_2O_3$, $SiO_2$, MgO, BaO, $MoO_3$ and $V_2O_5$, and a fine particle of a composite oxide thereof. Among these, particularly preferred is an electrically conductive material mainly comprising $SnO_2$ and containing from about 5 to 20% of antimony oxide and/or other components (for example, silicon oxide, boron, phosphorus) . The fine particle of the electrically conductive crystalline oxide or a composite oxide thereof preferably has a volume resistivity of $10^7$ Ωcm or less, more preferably $10^6$ Ωcm or less, still more preferably $10^5$ Ωcm or less.

An undercoat layer provided between the surface-treated support and a light-sensitive layer is described below. The undercoat layer is formed by a so-called superposed layer method of coating a layer capable of well adhering to the support as the first layer (hereinafter simply referred to as a "first undercoat layer") and coating thereon a layer capable of well adhering to both the first undercoat layer and a photographic layer as the second layer (hereinafter abbreviated as a "second undercoat layer") or by a single layer method of coating only one layer capable of well adhering to both the support and a photographic layer.

Examples of the material which can be used for the first undercoat layer in the superposed layer method include copolymers starting from monomers selected from vinyl chloride, vinylidene chloride, butadiene, vinyl acetate, styrene, acrylonitrile, methacrylic acid esters, methacrylic acid, acrylic acid, itaconic acid, maleic anhydride and the like; epoxy resin; gelatin; nitrocellulose; and polyvinyl acetate. For the second undercoat layer, gelatin is mainly used.

In the single layer method, a technique of swelling the support to allow it to interface-mix with the undercoat polymer and thereby attain good adhesion is used in many cases. Examples of the undercoat polymer include water-soluble polymers such as gelatin, gelatin derivatives, casein, agar, sodium alginate, starch, polyvinyl alcohol, polyacrylic acid copolymers and maleic anhydride copolymers; cellulose esters such as carboxymethyl cellulose and hydroxyethyl cellulose; and latex polymers such as vinyl chloride-containing copolymers, vinylidene chloride-containing copolymers, acrylic ester-containing copolymers and vinyl acetate-containing copolymers. Among these, gelatin is preferred. The gelatin may be any gelatin commonly used in the art, such as lime-treated gelatin, acid-treated gelatin, enzyme-treated gelatin, gelatin derivatives and modified gelatin. Among these, lime-treated gelatin and acid-treated gelatin are most preferred.

The above-described undercoat polymer can be hardened. Examples of the hardening agent include chromium salts (e.g., chromium alum), aldehydes (e.g., formaldehyde, glutaraldehyde), epoxy compounds, isocyanates, activated halogen compounds (e.g., 2,4-dichloro-6-hydroxy-s-triazine), epichlorohydrin resin, polyamide-epichlorohydrin resin, cyanuric chloride-series compounds, vinyl sulfone- and sulfonyl-series compounds, carbamoyl ammonium salt-series compounds, amidinium salt-series compounds, carbodiimide-series compounds and pyridinium salt-series compounds.

The undercoat layer for use in the present invention may contain various additives, if desired. Examples thereof include a surfactant, an antistatic agent, a dye for coloring an antihalation agent, a pigment, a coating aid and an antifoggant.

Furthermore, the undercoat layer for use in the present invention may contain an inorganic or organic fine particle as a matting agent to such an extent that the fine particle does not substantially impair the transparency and graininess of the image. Examples of the inorganic fine particle matting agent which can be used include silica ($SiO_2$), titanium dioxide ($TiO_2$), calcium carbonate and magnesium carbonate. Examples of the organic fine particle matting agent which can be used include polymethyl methacrylate, cellulose acetate propionate, polystyrene, those soluble in a processing solution described in U.S. Pat. No. 4,142,894, arld polymers described in U.S. Pat. No. 4,396,706. The fine particle matting agent preferably has an average particle size of 0.01 to 10 μm, more preferably from 0.05 to 5 μm. The content thereof is preferably from 0.5 to 600 mg/m$^2$, more preferably from 1 to 400 mg/m$^2$.

Examples of the compound capable of swelling the support for use in the present invention include resorcin, chlororesorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid and chloral hydrate. Among these, resorcin and p-chlorophenol are preferred.

In the present invention, the light-sensitive material may have a light-sensitive silver halide emulsion layer on both surfaces or only on one surface. In the case of having an emulsion layer on one surface, a back layer is preferably provided on the side opposite to the emulsion layer side of the support of the present invention. The back layer generally comprises several constituent layers so as to exert various functions. Examples thereof include a contact layer, an antistatic layer, a scratch resistance-imparting layer, a slipping layer, an anti-blocking layer and a curl-preventing layer. In addition, a transparent magnetic recording layer described in U.S. Pat. Nos. 3,782,947 and 4,279,945 may also be provided.

These layers are not particularly limited with respect to the order in construction and on the thickness thereof and depending on the case, two or more layers having the same function may also be provided. The thickness of each layer is preferably from 0.0001 to 10 μm, more preferably from 0.001 to 5 μm. The total thickness of all layers is preferably from 0.001 to 10 μm.

The constituent layers on the back side each may be formed only from a material having the intended function, however, a binder is usually used in combination. The binder may be a hydrophobic polymer or a hydrophilic polymer commonly used for a subbing layer, or may be crosslinked like a latex.

As one of the functions of the back layer, an antistatic layer is provided and this can be provided by the method described above.

In the case of providing a slipping layer, known examples of the lubricant used therefor include polyorganosiloxanes disclosed in JP-B-53-292 (the term "JP-B" as used herein means an "examined Japanese patent publication"), higher fatty acid amides disclosed in U.S. Pat. No. 4,275,146, higher fatty acid esters (esters of a fatty acid having from 10 to 24 carbon atoms with an alcohol having from 10 to 24 carbon atoms) disclosed in JP-B-58-33541, British Patent 927,446, JP-A-55-126238 and JP-A-58-90633, metal salts of higher fatty acids disclosed in U.S. Pat. No. 3,933,516, esters of a straight chain higher fatty acid with a straight chain higher alcohol disclosed in JP-A-58-50534, and esters of a higher fatty acid containing a branched alkyl group with a higher alcohol disclosed in International Publication No. 90108115.8.

Examples of the polyorganosiloxane which can be used include commonly known modified polysiloxanes, for example, polyalkylsiloxanes such as polydimethylsiloxane and polydiethylsiloxane, polyarylsiloxanes such as polydiphenylsiloxane and polymethylphenylsiloxane, organopolysiloxanes containing an alkyl group having 5 or more carbon atoms described in JP-B-53-292, JP-B-55-49294 and JP-A-60-140341, alkylpolysiloxanes containing a polyoxyalkylene group on the side chain, and organopolysiloxanes containing an alkoxy group, a hydroxy group, hydrogen atom, a carboxyl group, an amino group or a mercapto group on the side chain. In addition, block copolymers containing a siloxane unit, and graft copolymers containing a siloxane unit on the side chain described in JP-A-60-191240 may also be used.

Examples of the higher fatty acid and a derivative thereof, and the higher alcohol and a derivative thereof include higher fatty acids, metal salts of higher fatty acids, higher fatty acid esters, higher fatty acid amides, polyhydric alcohol esters of higher fatty acids, higher aliphatic alcohols and monoalkylphosphites, dialkyl-phosphite, trialkylphosphites, monoalkylphosphates, dialkylphosphates arLd trialkylphosphates thereof, and higher aliphatic alkylsulfonates and amides thereof.

The materials constituting the slipping layer are described in detail in *Japan Institute of Invention and Innovation, Journal of Technical Disclosure*, No. 94-6023, and the slipping layer may be formed according thereto.

The amount of the lubricant used is not particularly limited, however, in order to bring about sufficiently high slipperiness and scratch resistance, the content thereof is preferably from 0.001 to 0.1 g/m$^2$, more preferably from 0.005 to 0.05 g/m$^2$.

In order to record various information, the silver halide photographic light-sensitive material of the present invention may have a magnetic recording layer described in JP-A-6-059357. The magnetic recording layer is preferably provided on the back surface of the support and may be provided by coating or printing. Furthermore, the light-sensitive material may also have a space for optically recording various information.

On the support where an undercoat layer and a back layer are provided as above, a silver halide light-sensitive layer is provided.

The light-sensitive material of the present invention is sufficient if at least one light-sensitive layer is provided on the support. A typical example thereof is a silver halide photographic light-sensitive material comprising a support having thereon at least one color-sensitive layer consisting of a plurality of silver halide emulsion layers having substantially the same spectral sensitivity but different in the light sensitivity. This light-sensitive layer is a unit light-sensitive layer having spectral sensitivity to any one of blue light, green light and red light. In the case of a multi-layer silver halide color photographic light-sensitive material, the unit light-sensitive layers are generally arranged in the order of a red-sensitive layer, a green-sensitive layer and a blue-sensitive layer from the support side. However, depending upon the purpose, this arrangement order may be reversed or a layer having different light sensitivity may be interposed between layers having the same spectral sensitivity. A light-insensitive layer may also be provided between the above-described silver halide light-sensitive layers or as an uppermost or lowermost layer. This layer may contain a coupler, a DIR compound, a color staining inhibitor and the like, which are described later. The plurality of silver halide emulsion layers constituting each unit light-sensitive layer are preferably arranged as described in German Patent 1,121,470 and British Patent 923,045, where two layers of a high-sensitivity emulsion layer and a low-sensitivity emulsion layer are provided such that the light sensitivity sequentially decreases toward the support. Furthermore, it may also be possible to provide a low-sensitivity emulsion layer farther from the support and provide a high-sensitivity emulsion layer closer to the support as described in JP-A-57-112751, JP-A-62-200350, JP-A-62-206541 and JP-A-62-206543.

Specific examples of the layer arrangement from the side farthest from the support (S) include an order of low-sensitivity blue-sensitive layer (BL)/high-sensitivity blue-sensitive layer (BH)/high-sensitivity green-sensitive layer (GH)/low-sensitivity green-sensitive layer (GL)/high-sensitivity red-sensitive layer (RH)/low-sensitivity red-sensitive layer (RL) (i.e., BL/BH/GH/GL/RH/RL/S), an order of BH/BL/GL/GH/RH/RL/S and an order of BH/BL/GH/GL/RL/RH/S.

In addition, as described in JP-B-55-34932, the emulsion layers may be arranged in the order of blue-sensitive layer/GH/RH/GL/RL from the side farthest from the support. Also, as described in JP-A-56-25738 and JP-A-62-63936, the emulsion layers may be arranged in the order of blue-sensitive layer/GL/RL/GH/RH from the side farthest from the support.

Furthermore, an arrangement consisting of three layers different in the light sensitivity described in JP-B-49-15495 may be used, where a silver halide emulsion layer having highest light sensitivity is provided as an upper layer, a silver halide emulsion layer having light sensitivity lower than that is provided as a medium layer and a silver halide emulsion layer having light sensitivity lower than that of the medium layer is provided as a lower layer so as to sequentially decrease the light sensitivity toward the support. Even in this structure consisting of three layers different in the light sensitivity, the layers having the same spectral sensitivity may be provided in the order of medium-sensitivity emulsion layer/high-sensitivity emulsion layer/low-sensitivity emulsion layer from the side farther from the support as described in JP-A-59-202464. Other than these, the arrangement in the order of high-sensitivity emulsion layer/low-sensitivity emulsion layer/medium-sensitivity emulsion layer or low-sensitivity emulsion layer/medium-sensitivity emulsion layer/high-sensitivity emulsion layer may also be used. The layer arrangement may be changed as described above also in the case of structures consisting of four or more layers.

In order to improve the color reproducibility, a donor layer (CL) of an interimage effect which is different in the spectral sensitivity distribution from the main light-sensitive layers such as BL, GL and RL is preferably provided adjacent to or in the neighborhood of a main light-sensitive layer as described in U.S. Pat. Nos. 4,663,271, 4,705,744 and 4,707,436, JP-A-62-160448 and JP-A-63-89850.

The silver halide which is preferably used in the present invention is silver iodobromide, silver iodochloride or silver iodochlorobromide each having a silver iodide content of about 30 mol % or less, more preferably silver iodobromide or silver iodochlorobromide having a silver iodide content of about 2 mol % to about 10 mol %.

The silver halide grain in the photographic emulsion may be a grain having a regular crystal form such as cubic, octahedral and tetradecahedral, a grain having an irregular crystal form such as spherical and plate-like, a grain having a crystal defect such as twin, or a composite form of these grains.

The monodisperse emulsion described in U.S. Pat. Nos. 3,574,628 and 3,655,394 and British Patent 1,413,748 are also preferred.

A tabular grain having an aspect ratio of about 3 or more may also be used in the present invention. The tabular grain can be easily prepared by the method described in Gutoff, *Photographic Science and Engineering*, Vol. 14, pp. 248–257 (1970), U.S. Pat. Nos. 4,434,226, 4,414,310, 4,433,048 and 4,439,520 and British Patent 2,112,157.

The crystal structure may be homogeneous, may be different in the halogen composition between the interior and the exterior, or may have a layer structure. Also, silver halides different in the composition may be joined by an epitaxial conjunction, for example, the silver halide may be joined with a compound other than silver halide, such as silver rhodanide or zinc oxide. In addition, a mixture of grains having various crystal forms may also be used.

The emulsion may be either a surface latent image-type emulsion in which a latent image is mainly formed on the surface, or an internal latent image-type emulsion in which a latent image is formed inside the grain, but must be a negative working emulsion. The internal latent image-type emulsion may be a core/shell internal latent image-type emulsion described in JP-A-63-264740 and the preparation method thereof is described in JP-A-59-133542. The thickness of shell part of this emulsion varies depending on the development processing and the like, but is preferably from 3 to 40 nm, more preferably from 5 to 20 nm.

The photographic additives which can be used in the present invention are also described in RD, and the pertinent portions are shown in the Table below.

| Kinds of Additives | RD17643 | RD18716 | RD307105 |
| --- | --- | --- | --- |
| 1. Chemical sensitizer | p. 23 | p. 648, right col. | p. 866 |
| 2. Sensitivity increasing agent | | p. 648, right col. | |
| 3. Spectral sensitizer, supersensitizer | pp. 23–24 | p. 648, right col. to p. 649, right col. | pp. 866–868 |
| 4. Brightening agent | p. 24 | p. 647, right col. | p.868 |
| 5. Light absorbent, filter dye, UV absorbent | pp. 25–26 | p. 649, right col. to p. 650, left col. | p.873 |
| 6. Binder | p. 26 | p. 651, left col. | pp. 873–874 |
| 7. Plasticizer, lubricant | p. 27 | p. 650, right col. | p. 876 |
| 8. Coating aid, surfactant | pp. 26–27 | p. 650, right col. | pp. 875–876 |
| 9. Antistatic agent | p. 27 | p. 650, right col. | pp. 876–877 |
| 10. Matting agent | | | pp. 878–879 |

Various dye-forming couplers can be used in the light-sensitive material of the present invention and the following couplers are particularly preferred.

Yellow Coupler:

Couplers represented by formula (I) or (II) of EP-A-502424; couplers represented by formula (1) or (2) (particularly, Y-28 at page 18) of EP-A-513496; couplers represented by formula (I) in claim 1 of EP-A-568037; couplers represented by formula (I) in column 1, lines 45 to 55 of U.S. Pat. No. 5,066,576; couplers represented by formula (I) in paragraph 0008 of JP-A-4-274425; couplers (particularly, D-35 at page 18) described in claim 1 at page 40 of EP-A-498381; couplers represented by formula (Y) at page 4 (particularly, Y-1 (page 17) and Y-54 (page 41)) of EP-A-447969; couplers represented by any one of formulae (II) to (IV) in column 7, lines 36 to 58 (particularly, II-17, II-19 (column 17) and II-24 (column 19)) of U.S. Pat. No. 4,476,219.

Magenta Coupler:

L-57 (page 11, right lower column), L-68 (page 12, right lower column) and L-77 (page 13, right lower column) of JP-A-3-39737; [A-4]-63 (page 134), [A-4]-73 and [A-4]-75 (page 139) of EP 456257; M-4, M-6 (page 26) and M-7 (page 27) of EP 486965; M-45 (page 19) of EP-A-571959; M-1 (page 6) of JP-A-5-204106; M-22 in paragraph 0237 of JP-A-4-362631.

Cyan Coupler:

CX-1, CX-3, CX-4, CX-5, CX-11, CX-12, CX-14 and CX-15 (pages 14 to 16) of JP-A-4-204843; C-7, C-10 (page 35), C-34, C-35 (page 37), (I-1) and (I-17) (pages 42 and 43) of JP-A-4-43345; couplers represented by formulae (Ia) and (Ib) in claim 1 of JP-A-6-67385.

Polymer Coupler:

P-1 and P-5 (page 11) of JP-A-2-44345.

As the coupler which provides a colored dye having an appropriate diffusibility, those described in U.S. Pat. No. 4,366,237, British Patent 2,125,570, EP-B-96873 and German Patent 3,234,533 are preferred. As the coupler for correcting unnecessary absorption of a colored dye, yellow colored cyan couplers represented by any one of formulae (CI), (CII), (CIII) and (CIV) described at page 5 of EP-A-456257 (particularly, YC-86 at page 84); yellow colored magenta couplers ExM-7 (page 202), EX-1 (page 249) and EX-7 (page 251) described in EP-A-456257; magenta colored cyan couplers CC-9 (column 8) and CC-13 (column 10) described in U.S. Pat. No. 4,833,069; and colorless masking couplers represented by formula (2) (column 8) of U.S. Pat. No. 4,837,136 and formula (A) in claim 1 of WO92/11575 (particularly, compounds described in pages 36 to 45) are preferred.

Compounds (including couplers) which release a photographically useful compound residue upon reaction with an oxidation product of a developing agent are described below.

Development Inhibitor-Releasing Compound:

Compounds represented by any one of formulae (I), (II), (III) and (IV) described at page 11 of EP-A-378236 (particularly, T-101 (page 30), T-104 (page 31), T-113 (page 36), T-131 (page 45), T-144 (page 51) and T-158 (page 58)); compounds represented by formula (I) described at page 7 of EP-A-436938 (particularly, D-49 (page 51)); compounds represented by formula (1) of EP-A-568037 (particularly, (23) (page 11)); and compounds represented by any one of formulae (I), (II) and (III) described at pages 5 and 6 of EP-A-440195 (particularly, I-(1) at page 29).

Bleaching Accelerator-Releasing Compound:

Compounds represented by formula (I) or (I') at page 5 of EP-A-310125 (particularly (60) and (61) at page 61); and compounds represented by formula (I) in claim 1 of JP-A-6-59411 (particularly, (7) (page 7)).

Ligand-Releasing Compound:

Compounds represented by LIG-X described in claim 1 of U.S. Pat. No. 4,555,478 (particularly, compounds in column 12, lines 21 to 41).

Leuco Dye-Releasing Compound:

Compounds 1 to 6 in columns 3 to 8 of U. S. Pat. No. 4,749,641.

Fluorescent Dye-Releasing Compound:

Compounds represented by COUP-DYE in claim 1 of U.S. Pat. No. 4,774,181 (particularly, compounds 1 to 11 in columns 7 to 10).

Development Accelerator- or Fogging Agent-Releasing Compound:

Compounds represented by any one of formulae (1), (2) and (3) in column 3 of U.S. Pat. No. 4,656,123 (particularly (I-22) in column 25) and ExZK-2 at page 75, lines 36 to 38 of EP-A-450637.

Compound Which Releases Group Capable of Becoming Dye First When Released:

Compounds represented by formula (I) in claim 1 of U.S. Pat. No. 4,857,447 (particularly, Y-1 to Y-19 in columns 25 to 36).

Furthermore, a color negative light-sensitive material as Sample 201 in Example 2 of JP-A-9-146237 or a color reversal light-sensitive material as Sample 101 in Example 1 of JP-A-11-84601 may be preferably coated on the support of the present invention.

The evaluation and measurement methods used in the present invention are described below. In the present invention, the measurement was performed using a tensile tester Strograph-Model R2 manufactured by Toyo Seiki K. K.

(1) Tear Strength

The tear strength was measured according to JIS P8116-1976 at 25° C. and 60% RH.

(2) Break Strength/Elongation at Break

The sample was cut into a width of 10 mm and the break strength/elongation at. break was measured at chuck intervals of 20 mm, a stretching rate of 2 mm/min, 25° C. and 60% RH.

(3) Core Set Curl

After conditioning the humidity at 25° C. and 60% RH for 3 hours, the sample was wound around a core having a diameter of 7 mm, fixed with a tape and core-set at 80° C. for 2 hours. Thereafter, the sample was allowed to cool at 25° C. for 60% RH for 3 hours and then opened. At this time, the radius of the innermost circumference was measured by slide calipers. The reciprocal of this radius (m) was used as the core set curl value.

(4) Refractive Index

The refractive indexes in MD, TD and the thickness direction of the polyester support each was measured using an Abbe refractometer at 25° C. and 60% RH under a D ray of an Na lamp. At this measurement, methylene sulfur iodide was used as the intermediate solution.

(5) Modulus

The sample was cut into 10 mm in width and 200 mm in length and after conditioning the humidity at 25° C. and 60% RH for 3 hours or more, the moduli in MD and TD each was measured at chuck intervals of 100 mm and a pulling rate of 10 mm/min.

(6) Haze

The haze was measured according to JIS-K6714.

(7) Total Light Transmittance

The total light transmittance was measured according to JIS-K6714.

(8) Loss Modulus (tan$\delta$)

The loss modulus was measured at an oscillation frequency of 11 Hz while elevating the temperature from 25° C. to 250° C. at a rate cf 4° C./min. Among these, the value at 150° C. was obtained.

(9) Heat Dimensional Change Ratio (1) After conditioning the humidity at 25° C. and 60% RH for 12 hours or more, the length of the sample was measured using a pin gauge (this length was defined as $L_1$).

(2) The sample was placed in an air constant temperature tank at 150° C. of 30 minutes under no tension.

(3) The sample was taken out and after conditioning the humidity at 25° C. and 60% RH for 12 hours or more, the length was measured using a pin gauge (this length was defined as $L_2$).

(4) The absolute value of the difference between $L_2$ and $L_2$ was divided by $L_1$ and then multiplied by 100 and the value obtained was used as the heat dimensional change ratio (%).

The operations (1) to (4) were performed for both MD and TD of the sample.

(10) Heat of Crystal Fusion, Glass Transition Temperature (Tg), Calorie of Endothermic Peak Appeared Between 100° C. and 170° C.

These were meaLsured using a differential thermal analyzer according to the following method.

(1) In a nitrogen stream, 20 mg of the sample was set on an aluminum-made pan.

(2) The temperature was elevated up to 330° C. at 10° C./min (1st run).

From this thermogram, the followings were determined.

i) Heat of Crystal Fusion

A base line running from 330° C. to 290° C. was interpolated. From the area defined by this base line and the endothermic peak having a peak between 220° C. and 280° C., the heat of fusion was determined.

ii) Calorie of Endothermic Peak Appearing Between 100° C. and 170° C.

From the area defined by a straight line connecting a base line from 80° C. to 100° C. and a base line from 170° C. to 190° C., and an endothermic peak appearing between 100° C. and 170° C., the endothermic calorie was determined.

(3) The sample was quenched to room temperature and rendered amorphous.

(4) Again, the temperature was elevated at 20° C./min (2nd run).

From this thermogram, the following was determined.

iii) Tg

An arithmetic irean of a temperature which started deviating from a base line and a temperature which returned to a new base line was defined as Tg.

(11) Orientation Angle (MOR)

Both edges of the support after the film formation were measured on MOR using a molecular orientation meter (MOA-30001A, manufactured Oji Keisoku Kiki K. K., where the dipole-dipole interaction between a microwave and the support is measured over all in-plane directions and the anisotropy is processed into numerical values), thereby determining the orientation angle.

(12) Thickness Unevenness

MD:

A film of TD 5 cm×MD 1.5 m was slit at three points, namely, the center and both edges in the width direction, and the thickness of each point was measured by a continuous thickness meter. An average in the range (difference between maximum and minimum) of each sample was determined.

TD:

Three strips each in a size of MD 5 cm×TD 1.5 m were slit at intervals of 10 m and measured by a continuous thickness meter. An average in the range of each sample was determined.

(13) Generation Ratio of Delamination

The measurement was performed at 25° C. and 60% RH according to JIS P8116-1976.

The sample torn according to this method was observed through a magnifier over the entire length of the torn surface. The length of the portion obliquely torn in a cut width of 0.2 mm or more was measured, divided by the entire tear length and shown by %. The value obtained was defined as the generation ratio of delamination. In this measurement, the ratio was obtained as an average of 10 points.

(14) Bending Strength

The bending strength was measured according to JIS P8115.

(15) Intrinsic Viscosity (1) Polyester was dissolved in a mixed solvent of phenol/1,1,2,2-tetrachloroethane (weight ratio: 60/40) to prepare solutions of 0.2 g/dl, 0.6 g/dl and 1.0 g/dl.

(2) Each solution was measured at 20° C. using a Ubbelohde's viscometer.

(3) The viscosities were plotted with respect to the concentration and the viscosity extrapolated with a concentration of 0 was defined as an intrinsic viscosity.

The present invention is described in greater detail below by referring to the Examples, however, the present invention should not be construed as being limited thereto.

EXAMPLE 1

(1) Preparation of Polyethylene Naphthalate-Type Support (1-1) Preparation of Support of the Present Invention (1-1-1) Polymerization of Polyethylene Naphthalate-Type Polymer

1) PEN

100 Parts of dimethyl 2,6-naphthalenedicarboxylate, 58 parts of ethylene glycol, 0.029 part of manganese acetate tetrahydrate, 0.028 part of antimony trioxide and 0.1% of spherical silica particles having an average particle size of 0.3 µm were mixed and heated at 200° C. with stirring. While removing the by-product methanol, the temperature was elevated to 235° C. After the production of by-product methanol was terminated, 0.03 part of trimethylphosphoric acid was added and reacted for 2 hours under reduced pressure of 0.3 Torr while elevating the temperature to 285° C. Thereto, the dyes Compound I-6 and Compound I-24 described in JP-A-7-168309 were added each in an amount of 54 ppm based on the solid contents. The intrinsic viscosity of this polymer was C.56.

2) Copolymer (CP-3, CP-4 and CP-6)

a) CP-3

A mixture of dimethyl 2,6-naphthalenedicarboxylate dimethyl adipate (80 parts:3 parts) was dispersed in a mixture of ethylene glycol:BPA·2EO (40 parts:10 parts) and thereto, 0.029 part of manganese acetate tetrahydrate, 0.028 part of antimony trioxide and 0.1% of spherical silica particles having an average particle size of 0.3 µm were added and reacted under heating with stirring. While removing the by-product methanol, the temperature was elevated to 235° C. After the production of by-product methanol was terminated, 0.03 part of trimethylphosphoric acid was added and reacted for 2 hours under reduced pressure of 0.3 Torz while elevating the temperature to 285° C. Thereto, the dyes Compound I-6 and Compound I-24 described in JP-A-7-168309 were added each in an amount of 54 ppm based on the solid contents. The intrinsic viscosity of this polymer was 0.58.

b) CP-4

A mixture of dLmethyl 2,6-naphthalenedicarboxylate dimethyl isophthalate (80 parts:13 parts) was dispersed in a mixture of ethylene glycol:BPA-2EO (40 parts:10 parts) and thereto, 0.029 part of manganese acetate tetrahydrate, 0.028 part of antimony trioxide and 0.1% of spherical silica particles having an average particle size of 0.3 µm were added and reacted under heating with stirring. While removing the by-product methanol, the temperature was elevated to 235° C. After the production of by-product methanol was terminated, 0.03 part of trimethylphosphoric acid was added and reacted for 2 hours under reduced pressure of 0.3 Torr while elevating the temperature to 285° C. Thereto, the dyes Compound I-6 and Compound I-24 described in JP-A-7-168309 were added each in an amount of 54 ppm based on the solid contents. The intrinsic viscosity of this polymer was 0.61.

c) CP-6

A mixture of dimethyl 2,6-naphthalenedicarboxylate dimethyl isophthalate (80 parts:6.5 parts) was dispersed in a mixture of ethylene glycol:BPA·3EO (40 parts:10 parts) and thereto, 0.029 part of manganese acetate and 0.028 part of antimony trioxide were added and reacted under heating with stirring. While removing the by-product methanol, the temperature was elevated to 235° C. After the production of by-product methanol was terminated, 0.03 part of trimethylphosphoric acid was added and reacted for 2 hours under reduced pressure of 0.3 Torr while elevating the temperature to 285° C. Thereto, the dyes Compound I-6 and Compound I-24 described in JP-A-7-168309 were added each in an amount of 54 ppm based on the solid contents. The intrinsic viscosity of this polymer was 0.58.

3) Preparation of Polymer Blend (PB-8)

PEN and CP-4 prepared above were mixed at a weight ratio of 5:5, dried at 140° C. for 19 hours and then knead-extruded at 310° C. using a twin screw extruder.

(1-1-2) Film Formation of Polyethylene Naphthalate-Type Support

The polyethylene naphthalate-type polymers prepared above each was formed into pellets and dried at 160° C. for 3 hours under reduced pressure. The pellets were melted at 310° C. using two units of tandem fixed single screw extruders, filtered through a 5-μm mesh filter and extruded from a T-die onto an electrostatically charged casting drum at 50° C. to prepare an unstretched film.

The film obtained was subjected to MD stretching, TD stretching, heat setting and heat relaxation under the ditions shown in Table 1. The total standard film width 1.8 m and thereafter, by the trimming of both edges, film width was reduced to 1.5 m. Furthermore, both es were knurled to a height of 30 μm and a width of mm and then, the Eilm was taken up every 3,000 m around core having a diameter of 30 cm. The thus-obtained ports each had a thickness shown in Table 2.

1-2) Film Formation of Support For Comparison

PEN was formed into a film according to Example 1 of A-10-293381.

TABLE 1

(Contents of Support)

| | | | Pre-Stage MD Stretching | | | | TD Stretching | | | | Post-Stage MD stretching | | Heat Setting | | |
| | | | First Stretching | | Second Stretching | | First Stretching | | Second Stretching | | | | | | |
| | Material | Tg, °C | Magnification | Temperature, °C | Magnification | Temperature, °C | Magnification | Temperature, °C | Magnification | Temperature, °C | Magnification | Temperature, °C | Temperature, °C | Time | Relaxation, % |
|---|---|---|---|---|---|---|---|---|---|---|---|---|---|---|---|
| Sample 1 (Invention) | CP-3 | 105 | 1.2 | 125 | 1.3 | 127 | 4.0 | 133 | — | — | — | — | 210 | 60 | 6 |
| Sample 2 (Invention) | CP-3 | 105 | 1.4 | 128 | 1.6 | 130 | 4.0 | 133 | 1.2 | 138 | 1.1 | 140 | 230 | 40 | 3 |
| Sample 3 (Invention) | CP-3 | 105 | 1.5 | 128 | 1.5 | 130 | 4.2 | 135 | 1.2 | 138 | 1.2 | 140 | 235 | 30 | 4 |
| Sample 4 (Invention) | CP-3 | 105 | 2.2 | 130 | — | — | 3.5 | 133 | 1.5 | 140 | 1.1 | 140 | 230 | 40 | 3 |
| Sample 5 (Invention) | CP-6 | 108 | 1.2 | 127 | 1.3 | 130 | 4.0 | 135 | — | — | — | — | 230 | 40 | 3 |
| Sample 6 (Invention) | CP-6 | 108 | 1.5 | 130 | 1.7 | 135 | 4.0 | 135 | 1.2 | 140 | 1.1 | 140 | 235 | 30 | 4 |
| Sample 7 (Invention) | CP-6 | 108 | 1.5 | 130 | 1.5 | 135 | 3.8 | 135 | 1.2 | 140 | 1.2 | 140 | 240 | 20 | 3 |
| Sample 8 (Invention) | CP-6 | 108 | 2.5 | 130 | — | — | 4.2 | 135 | 1.2 | 140 | — | — | 240 | 20 | 3 |
| Sample 9 (Invention) | PB-8 | 110 | 1.2 | 127 | 1.3 | 130 | 4.0 | 135 | — | — | — | — | 230 | 40 | 4 |
| Sample 10 (Invention) | PB-8 | 110 | 1.5 | 130 | 1.7 | 135 | 4.0 | 135 | 1.2 | 140 | 1.1 | 140 | 235 | 30 | 3 |
| Sample 11 (Invention) | PB-8 | 110 | 2.5 | 130 | — | — | 4.2 | 135 | 1.2 | 140 | — | — | 240 | 20 | 3 |
| Comparative Sample 1 | PEN | 119 | 1.0 | 105 | — | — | 3.0 | 135 | — | — | — | — | 170 | 30 | 5 |

(2) Evaluation of Support

The supports of the present invention and for comparison prepared above were evaluated and the results obtained are shown in Table 2 below.

side opposite the back layer as shown in Table 3.
Color Negative Light-Sensitive Material:
 The same as Sample 201 in Example 2 of JP-A-9-146237 (shown as CN in Table 3).

TABLE 2

|  | Thickness | | | Tear Strength | | Break Strength | | Elongation at Break | | Core Set | Heat of | Total Light | |
| --- | --- | --- | --- | --- | --- | --- | --- | --- | --- | --- | --- | --- | --- |
|  | Average, $\mu$m | Thickness Unevenness | | | | | | | | Curl in MD, m$^{-1}$ | Crystal, J/g | Transmittance, % | Haze, % |
|  |  | MD, $\mu$m | TD, $\mu$m | TD, g | MD/TD | TD, Kgf/mm$^2$ | MD, Kgf/mm$^2$ | TD, % | MD, % |  |  |  |  |
| Sample 1 (Invention) | 120 | 5 | 4 | 25 | 3.5 | 37 | 3 | 40 | 160 | 60 | 45 | 85 | 1.1 |
| Sample 2 (Invention) | 110 | 5 | 4 | 50 | 2.2 | 25 | 15 | 60 | 120 | 55 | 47 | 90 | 0.4 |
| Sample 3 (Invention) | 115 | 3 | 2 | 55 | 2.1 | 27 | 12 | 70 | 100 | 65 | 50 | 87 | 0.6 |
| Sample 4 (Invention) | 100 | 3 | 2 | 80 | 1.5 | 20 | 23 | 80 | 90 | 60 | 47 | 92 | 0.5 |
| Sample 5 (Invention) | 120 | 6 | 4 | 30 | 2.5 | 33 | 7 | 50 | 140 | 55 | 48 | 85 | 0.3 |
| Sample 6 (Invention) | 115 | 6 | 4 | 50 | 2.0 | 24 | 17 | 80 | 50 | 45 | 50 | 88 | 0.9 |
| Sample 7 (Invention) | 100 | 5 | 3 | 75 | 1.5 | 20 | 20 | 70 | 100 | 60 | 52 | 92 | 0.6 |
| Sample 8 (Invention) | 120 | 4 | 3 | 60 | 2.1 | 25 | 17 | 80 | 110 | 50 | 55 | 85 | 0.5 |
| Sample 9 (Invention) | 120 | 4 | 4 | 30 | 3.5 | 35 | 7 | 30 | 170 | 55 | 50 | 85 | 0.3 |
| Sample 10 (Invention) | 115 | 5 | 4 | 55 | 2.1 | 25 | 16 | 70 | 100 | 45 | 53 | 90 | 0.5 |
| Sample 11 (Invention) | 100 | 4 | 3 | 65 | 2.0 | 25 | 14 | 80 | 110 | 50 | 55 | 93 | 0.5 |
| Comparative Sample 1 | 105 | 10 | 12 | 5 | 15 | 40 | 1 | 10 | 220 | 100 | 35 | 90 | 1.2 |

(3) Preparation of Light-Sensitive Material

The supports of the present invention and for comparison prepared above each was subjected to a surface treatment described in Example 1 of JP-A-8-57951 and after providing a back first layer, to a heat treatment (BTA treatment) at a temperature of (Tg of each support −5° C.) for a time period shown in Table 2.

On each of the thus-treated supports, an undercoat layer, a back second layer and a back third layer were provided according to Example 1 of JP-A-8-57951. Thereafter, one of the following light-sensitive materials was provided on the Color Reversal Light-Sensitive Material:

The same as Sample 101 in Example 1 of JP-A-11-84601 (shown as CR in Table 3).

These light-sensitive materials with the support each was slit into a 135 light-sensitive material width (35 mm) or a brownie light-sensitive material width (60 mm) and then core set (wound around a core having a diameter of 11.5 mm and treated at 80° C. for 2 hours). Thereafter, the cuttability and perforability were evaluated by the following methods. The results are shown in Table 3 below.

TABLE 3

(Preparation of Light-Sensitive Material and Evaluation of Cuttability)

|  | | Evaluation of Cuttability | | | | | |
| --- | --- | --- | --- | --- | --- | --- | --- |
|  | | | Cuttability | | | Perforability | |
|  | Kind of Light-Sensitive Material Provided | Slit Width, mm | Uncut-tability, % | Generation of Flash, % | Generation of Chips, % | Generation of Cleavage, % | Generation of Flash, % | Generation of Cracks, % |
| Sample 1 (Invention) | CN | 35 | 0 | 0 | 0 | 0 | 0 | 0 |
| Sample 2 (Invention) | CN | 35 | 0 | 0 | 0 | 0 | 0 | 0 |
| Sample 3 (Invention) | CR | 60 | 0 | 1 | 0 | 0 | 0 | 0 |
| Sample 4 (Invention) | CN | 35 | 0 | 1 | 0 | 0 | 1 | 0 |
| Sample 5 | CN | 35 | 0 | 0 | 0 | 0 | 0 | 0 |

TABLE 3-continued (Preparation of Light-Sensitive Material and Evaluation of Cuttability)

| | | | Evaluation of Cuttability | | | | | |
| --- | --- | --- | --- | --- | --- | --- | --- | --- |
| | | | Cuttability | | | Perforability | | |
| | Kind of Light-Sensitive Material Provided | Slit Width, mm | Uncut-tability, % | Generation of Flash, % | Generation of Chips, % | Generation of Cleavage, % | Generation of Flash, % | Generation of Cracks, % |
| (Invention) Sample 6 | CN | 35 | 0 | 0 | 0 | 0 | 0 | 0 |
| (Invention) Sample 7 | CN | 35 | 0 | 1 | 0 | 0 | 1 | 1 |
| (Invention) Sample 8 | CR | 60 | 0 | 1 | 0 | 0 | 0 | 0 |
| (Invention) Sample 9 | CN | 35 | 0 | 0 | 0 | 0 | 0 | 0 |
| (Invention) Sample 10 | CR | 60 | 0 | 0 | 0 | 0 | 0 | 0 |
| (Invention) Sample 11 | CR | 60 | 0 | 1 | 0 | 0 | 1 | 1 |
| (Invention) Comparative Sample 1 | CN | 35 | 3 | 6 | 9 | 18 | 7 | 25 |

1) Evaluation Method of Cuttability

The evaluation was performed using a cutter built in a mini lab developing machine (Model FP550B, manufactured by Fuji Photo Film Co., Ltd.).

The cutting was made using "CONST (constant length mode)" (in the "normal mode", a tension is applied to the light-sensitive material at the cutting but in the CONST mode, the tension is not applied and the evaluation is made under severe conditions of difficult cutting).

The cutter blade used was abraded to a tip width of 0.1 mm (simulation of a blade used over several years).

The same sample was subjected to the cutting test 100 times and evaluated as follows.

a) Cuttability

The results were classified into the following three stages and respective generation ratios were determined. In any case, a value of 2% or more was not allowable.

Uncuttability:

An uncuttable portion was generated even in part.

Generation of Flash:

The sample could be cut but generation of flash could be discriminated with an eye.

Generation of Chips:

Attachment of chips to the sample could be discriminated with an eye.

b) Linearity of Cutting

The dislocation between two cut edges was measured and an average thereof is shown. In any case, a value of 2 mm or more was not allowable because the cutting ate into the image.

2) Evaluation Method of Perforability

135-Type perforations prescribed in JIS K7530-1987 were punched on both edges over a length of 1,000 m according to the method described in JP-A-1-271197. The perforating blade used here was a blade abraded after the perforation of light-sensitive material 100,000 times or more.

The cross section perforated every 10 m was observed through a scanning electron microscope at a 500 magnification and generation probabilities described below were determined. In any case, a value of 2% or more was not allowable.

Generation Ratio of Cleavage:

Those where the cross section was mostly separated in layers.

Generation Ratio of Flash:

Those where a hair-like flash remained on the cross section.

The perforations punched every 10 m were observed by a magnifier at a 30 magnification and the probability of generating cracks (fine fractures) was determined. A value of 2% or more was not allowable.

3) Coating Failure

The number of occurrences of coating unevenness and the like ascribable to the asperities generated upon the BTA treatment was measured per 1 $m^2$ by observing with an eye the light-sensitive material coated. The allowable number is 3 or less.

4) Planeness

After the coating of the light-sensitive material, the sample was cut into a 1-m square and after the humidity was conditioned at 23° C. and 55% RH, placed on a horizontal and flat desk. The height of corrugation was evaluated. Samples where corrugation of 5 mm or more was generated were not allowable.

EXAMPLE 2

(1) Preparation of PC)Polyester Support (1-1) Preparation of Support of the Present Invention (1-1-1) Polymerization of Polyester

1) PEN

PEN was prepared in the same manner as in Example 1.

2) Preparation of Copolymers (CP-4, CP-17 and CP-18)

(a) CP-4

CP-4 was prepared in the same manner as in Example 1.

(b) CP-17

Dimethyl 2,6-naphthalenedicarboxylate (100 parts) was dispersed in a mixture of ethylene glycol and cyclohexane dimethanol (46 parts:20 parts), and thereto 0.029 part of manganese acetate tetrahydrate, 0.028 part of antimony trioxide and 0.1% of spherical silica particles having an average particle size of 0.3 µm were added and reacted under heating with stirring. While removing the by-product methanol, the temperature was elevated to 235° C. After the production of by-product methanol was terminated, 0.03 part of trimethylphosphoric acid was added and polymerized for the time period shown in Table 4 under reduced pressure of 0.3 Torr while elevating the temperature to 285° C. Thereto, the dyes Compound I-6 and Compound I-24 described in JP-A-7-168309 were added each in an amount of 54 ppm based on the solid contents. The polymer obtained had an intrinsic viscosity shown in Table 4.

(c) CP-18

A mixture of dimethyl 2,6-naphthalenedicarboxylate dimethyl isophthalate (80 parts:3 parts) was dispersed in a mixture of $HO(CH_2CH_2O)_{80}H$:ethylene glycol (30 parts:40 parts), and thereto 0.029 part of manganese acetate tetrahydrate, 0.028 part of antimony trioxide and 0.1% of spherical silica particles having an average particle size of 0.3 μm were added and reacted under heating with stirring. While removing the by-product methanol, the temperature was elevated to 235° C. After the production of by-product methanol was terminated, 0.03 part of trimethylphosphoric acid was added and polymerized for the time period shown in Table 4 under reduced pressure of 0.3 Torr while elevating the temperature to 285° C. Thereto, the dyes Compound I-6 and Compound I-24 described in JP-A-7-168309 were added each in an amount of 54 ppm based on the solid contents. The polymer obtained had an intrinsic viscosity shown in Tale 4.

3) Preparation of Polymer Blend (PB-6)

A commercially available polycyclohexane dimethanol, polyarylate and the PEN prepared above were mixed at a weight ratio of 1:1:8, dried at 160° C. for 2 hours and then knead-extruded at 310° C. using a twin screw extruder. The thus-obtained polymer blend had an intrinsic viscosity shown in Table 4.

According to Invention 3 of JP-A-11-202446, PEN having an intrinsic viscosity shown in Table 4 was polymerized.

(1-1-2) Film Formation of Polyester Support

An unstretched film was prepared in the same manner as in Example 1.

The film obtained was subjected to pre-stage MD stretching, TD stretching and post-stage MD stretching under the conditions shown in Table 4. The stretching rate was 120%/sec in the pre-stage and post-stage MD stretching treatments and 80%/sec in the TD stretching.

After the TD stretching, the film was further subjected to heat treatment and heat setting under the conditions shown in Table 4.

The thus-obtained support had a thickness and Tg shown in Table 5. The total standard film width was 1.8 m and thereafter, by the trimming of both edges, the film width was reduced to 1.5 m. Furthermore, both edges were knurled to a height of 30 μm and a width of 100 mm and then, the film was taken up every 3,000 m around a core having a diameter of 30 cm.

(1-2) Preparation of Support For Comparison (1-2-1) Polymerization of Polyester

According to Invention 3 of JP-A-11-202446, PEN having an intrinsic viscosity shown in Table 4 was polymerized.

(1-2-2) Film Formation of Support

According to Invention 3 of JP-A-11-202446, PENs different in the intrinsic viscosity were blended as shown in Table 4 and formed into a film.

TABLE 4

(Conditions for Film Formation of Support)

| | Polyester | | | | Pre-Stage MD Stretching | | | |
| | | | | | First Stretching | | Second Stretching | |
| | Material | Polymerization Time, hr | Intrinsic Viscosity | Mixing Ratio, wt % | Magnification | Temperature, ° C. | Magnification | Temperature, ° C. |
|---|---|---|---|---|---|---|---|---|
| Sample 21 (Invention) | PEN | 3.0 | 0.60 | 80 | 1.2 | 125 | 1.2 | 130 |
| | PEN | 1.0 | 0.30 | 20 | | | | |
| Sample 22 (Invention) | PEN | 2.5 | 0.55 | 93 | 1.1 | 130 | 1.7 | 135 |
| | PEN | 1.5 | 0.44 | 7 | | | | |
| Sample 23 (Invention) | PEN | 4.0 | 0.65 | 57 | 1.1 | 120 | 1.2 | 125 |
| | PEN | 0.5 | 0.18 | 43 | | | | |
| Sample 24 (Invention) | PEN | 2.7 | 0.58 | 90 | 1.2 | 128 | 1.7 | 138 |
| | PEN | 0.7 | 0.20 | 10 | | | | |
| Sample 25 (Invention) | PEN | 2.2 | 0.52 | 70 | 1.8 | 130 | 1.1 | 130 |
| | PEN | 1.2 | 0.32 | 30 | | | | |
| Sample 26 (Invention) | PEN | 2.7 | 0.58 | 85 | 1.1 | 120 | — | — |
| | PEN | 0.8 | 0.25 | 15 | | | | |
| Sample 27 (Invention) | PEN | 2.6 | 0.57 | 75 | 1.1 | 118 | 1.6 | 135 |
| | PEN | 1.0 | 0.30 | 25 | | | | |
| Sample 28 (Invention) | PEN | 3.0 | 0.60 | 60 | 1.1 | 115 | 2.4 | 118 |
| | PEN | 1.0 | 0.30 | 40 | | | | |
| Sample 29 (Invention) | PEN | 3.0 | 0.60 | 85 | 1.5 | 110 | 1.6 | 113 |
| | CP-4 | 1.2 | 0.32 | 15 | | | | |
| Sample 30 (Invention) | CP-4 | 3.5 | 0.55 | 90 | 1.3 | 100 | 1.4 | 105 |
| | CP-18 | 1.1 | 0.30 | 10 | | | | |
| Sample 31 (Invention) | PEN | 2.0 | 0.50 | 80 | 1.4 | 115 | 1.7 | 120 |
| | CP-17 | 1.1 | 0.30 | 20 | | | | |
| Sample 32 (Invention) | PB-6 | — | 0.68 | 80 | 1.1 | 140 | 1.2 | 145 |
| | PEN | 2.0 | 0.50 | 20 | | | | |
| Comparative Sample 2 | PEN | 6.0 | 0.80 | 78 | 3.3 | 110 | — | — |
| | PEN | 1.3 | 0.40 | 22 | | | | |

TABLE 4-continued

(Conditions for Film Formation of Support)

| | TD Stretching | | | | Heat-Treatment | | | Post-Stage MD Stretching | | | Heat-Setting | | |
|---|---|---|---|---|---|---|---|---|---|---|---|---|---|
| | Total stretching Magnification | 1st Stage Stretching Magnification | 2nd Stage Stretching Magnification | Temperature, °C. | Temperature, °C. | Time, sec | Relaxation % | Stretching Magnification | Temperature, °C. | Stretching Magnification Ratio, TD/MD | Temperature, °C. | Time, sec | Relaxation, % |
| Sample 21 (Invention) | 4.0 | 2.0 | 2.0 | 135 | 150 | 30 | 3 | — | — | 2.8 | 245 | 30 | 3 |
| Sample 22 (Invention) | 3.8 | 1.3 | 2.9 | 135 | 165 | 20 | 5 | — | — | 2.0 | 250 | 15 | 5 |
| Sample 23 (Invention) | 4.5 | 3.0 | 1.5 | 140 | 185 | 10 | 1 | — | — | 3.5 | 240 | 45 | 1 |
| Sample 24 (Invention) | 3.5 | 1.5 | 2.3 | 140 | 180 | 15 | 2 | — | — | 1.7 | 235 | 20 | 2 |
| Sample 25 (Invention) | 4.7 | 2.5 | 1.9 | 135 | 170 | 20 | 3 | — | — | 2.3 | 230 | 75 | 3 |
| Sample 26 (Invention) | 5.0 | 1.2 | 4.2 | 130 | 160 | 25 | 6 | — | — | 4.5 | 235 | 55 | 5 |
| Sample 27 (Invention) | 4.3 | 3.5 | 1.2 | 140 | — | — | — | — | — | 2.4 | 225 | 100 | 1 |
| Sample 28 (Invention) | 3.2 | 2.0 | 1.6 | 120 | 140 | 60 | 7 | — | — | 1.2 | 240 | 20 | 5 |
| Sample 29 (Invention) | 4.8 | 1.6 | 3.0 | 118 | 130 | 80 | 8 | — | — | 1.9 | 220 | 120 | 6 |
| Sample 30 (Invention) | 3.9 | 3 | 1.3 | 110 | 125 | 110 | 9 | — | — | 2.1 | 212 | 175 | 9 |
| Sample 31 (Invention) | 4.1 | 1.5 | 2.7 | 130 | 145 | 45 | 4 | — | — | 1.7 | 230 | 60 | 3 |
| Sample 32 (Invention) | 4.1 | 2.7 | 1.5 | 150 | 195 | 2 | 0 | 1.3 | 155 | 2.4 | 263 | 7 | 0 |
| Comparative Sample 2 | 3.3 | 3.3 | — | 125 | — | — | — | — | — | 1.0 | 220 | 75 | 5 |

(3) Evaluation of Support

The supports of the present invention and for comparison prepared above evaluated and the results obtained are shown in Table 5 below. The measurements of each sample were made in the edge parts (10 cm from each trimmed edge and the center at the film formation, where the orientation angle was largest.

TABLE 5

(Evaluation of Support)

| | | Thickness | | | Tear Strength | | Generation Ratio of Delamination | | Modulus | | Elongation at Break | | Break Strength | |
|---|---|---|---|---|---|---|---|---|---|---|---|---|---|---|
| | | Average, μm | Unevenness TD, μm | MD, μm | TD, g | MD/TD | MD, % | TD, % | MD, Kg/mm² | TD/MD | TD, % | TD/MD | TD, Kg/mm² | MD, Kg/mm² |
| Sample 21 (Invention) | Center | 115 | 2 | 1 | 40 | 2.5 | 0 | 0 | 400 | 3.6 | 65 | 2.5 | 20 | 11 |
| | Edge | " | — | 3 | " | 2.7 | 0 | 0 | 430 | 3.8 | 60 | 2.3 | 21 | 12 |
| Sample 22 (Invention) | Center | 110 | 1 | 1 | 80 | 1.2 | 0 | 0 | 450 | 2.6 | 120 | 2.2 | 22 | 14 |
| | Edge | " | — | 2 | 85 | 1.1 | 0 | 0 | 480 | 3.0 | 135 | 2.1 | 23 | 14 |
| Sample 23 (Invention) | Center | 120 | 1 | 1 | 15 | 6.3 | 40 | 0 | 300 | 4.6 | 25 | 3.3 | 14 | 2 |
| | Edge | " | — | 2 | 20 | 4.8 | 55 | 0 | 320 | 4.8 | 35 | 3.5 | 14 | 3 |
| Sample 24 (Invention) | Center | 100 | 3 | 1 | 35 | 3.5 | 5 | 0 | 580 | 2.2 | 45 | 1.8 | 30 | 22 |
| | Edge | " | — | 2 | 45 | 2.8 | 7 | 0 | 600 | 2.4 | 60 | 2.0 | 32 | 23 |
| Sample 25 (Invention) | Center | 105 | 4 | 3 | 50 | 1.5 | 30 | 1 | 400 | 3.0 | 80 | 2.4 | 24 | 13 |
| | Edge | " | — | 5 | 55 | 2.3 | 70 | 3 | 600 | 2.8 | 120 | 2.7 | 31 | 16 |
| Sample 26 (Invention) | Center | 95 | 3 | 1 | 20 | 1.8 | 15 | 30 | 270 | 5.9 | 50 | 4.8 | 13 | 3 |
| | Edge | " | — | 2 | 25 | 1.2 | 20 | 40 | 380 | 5.8 | 95 | 3.5 | 17 | 5 |
| Sample 27 (Invention) | Center | 125 | 4 | 6 | 60 | 1.6 | 10 | 40 | 350 | 3.1 | 80 | 2.6 | 19 | 9 |
| | Edge | " | — | 8 | 90 | 1.1 | 20 | 50 | 500 | 3.8 | 135 | 3.5 | 24 | 8 |
| Sample 28 (Invention) | Center | 135 | 2 | 2 | 55 | 1.2 | 15 | 25 | 630 | 1.2 | 70 | 1.3 | 37 | 24 |
| | Edge | " | — | 2 | 70 | 1.4 | 25 | 30 | 650 | 1.4 | 80 | 1.5 | 39 | 25 |
| Sample 29 (Invention) | Center | 130 | 4 | 5 | 30 | 1.5 | 8 | 15 | 550 | 2.1 | 40 | 2.0 | 33 | 23 |
| | Edge | " | — | 6 | 40 | 2.2 | 10 | 17 | 570 | 2.2 | 60 | 2.2 | 36 | 24 |
| Sample 30 (Invention) | Center | 140 | 2 | 2 | 70 | 2.0 | 5 | 5 | 350 | 2.5 | 35 | 2.3 | 19 | 10 |
| | Edge | " | — | 3 | 80 | 3.3 | 10 | 10 | 380 | 2.7 | 45 | 2.7 | 18 | 9 |
| Sample 31 (Invention) | Center | 90 | 2 | 1 | 65 | 4.0 | 10 | 12 | 350 | 2.4 | 50 | 1.8 | 18 | 10 |
| | Edge | " | — | 1 | 75 | 2.8 | 14 | 15 | 330 | 2.3 | 55 | 2.0 | 16 | 9 |
| Sample 32 (Invention) | Center | 150 | 2 | 3 | 65 | 1.2 | 25 | 20 | 300 | 3.2 | 55 | 2.6 | 18 | 7 |
| | Edge | " | — | 1 | 50 | 1.8 | 35 | 40 | 280 | 3.0 | 65 | 2.8 | 20 | 6 |
| Comparative Sample 2 | Center | 90 | 12 | 11 | 155 | 1.1 | 90 | 95 | 660 | 1.1 | 150 | 1.1 | 45 | 29 |
| | Edge | " | — | 14 | 195 | 1.1 | 135 | 130 | 760 | 1.1 | 190 | 1.1 | 48 | 29 |

TABLE 5-continued (Evaluation of Support)

| | | Orientation | | Bending Strength | | Heat Dimensional change at 100° C. for 24 hours | | Total Light Transmittance, % | Haze, % | Tg, g | Core Set Curl | | Curl Value, m$^{-1}$ |
|---|---|---|---|---|---|---|---|---|---|---|---|---|---|
| | | | Angle | MD | TD/MD, times | MD, % | TD, % | | | | BTA Time, hr | Endothermic peak, J/g | |
| Sample 21 (Invention) | Center | — | | 180 | 5.5 | 0.08 | 0.11 | 95 | 0.3 | 119 | 10 | 1.0 | 35 |
| | Edge | 8 | | 200 | 5.3 | 0.09 | 0.13 | 95 | 0.3 | " | " | " | 35 |
| Sample 22 (Invention) | Center | — | | 950 | 7.5 | 0.04 | 0.07 | 91 | 0.8 | 119 | 100 | 3.0 | 30 |
| | Edge | 18 | | 970 | 6.5 | 0.06 | 0.08 | 90 | 0.9 | " | " | " | 30 |
| Sample 23 (Invention) | Center | — | | 40 | 15.0 | 0.13 | 0.15 | 94 | 0.4 | 117 | 1 | 0.2 | 50 |
| | Edge | 28 | | 50 | 14.0 | 0.16 | 0.15 | 94 | 0.5 | " | " | " | 30 |
| Sample 24 (Invention) | Center | — | | 100 | 3.5 | 0.14 | 0.14 | 96 | 0.2 | 118 | 20 | 1.5 | 33 |
| | Edge | 25 | | 100 | 3.3 | 0.15 | 0.15 | 95 | 0.3 | " | " | " | 33 |
| Sample 25 (Invention) | Center | — | | 180 | 4.0 | 0.14 | 0.17 | 97 | 0.2 | 119 | 5 | 0.5 | 45 |
| | Edge | 33 | | 280 | 3.3 | 0.16 | 0.18 | 96 | 0.3 | " | " | " | 45 |
| Sample 26 (Invention) | Center | — | | 100 | 19.0 | 0.24 | 0.14 | 96 | 0.2 | 119 | 250 | 4.0 | 15 |
| | Edge | 15 | | 150 | 15.0 | 0.28 | 0.14 | 96 | 0.2 | " | " | " | 15 |
| Sample 27 (Invention) | Center | — | | 450 | 6.0 | 0.23 | 0.25 | 98 | 0.1 | 118 | 0.2 | 0.6 | 40 |
| | Edge | 38 | | 630 | 5.8 | 0.29 | 0.28 | 97 | 0.1 | " | " | " | 40 |
| Sample 28 (Invention) | Center | — | | 300 | 1.4 | 0.15 | 0.15 | 93 | 0.6 | 117 | 450 | 4.8 | 10 |
| | Edge | 12 | | 380 | 1.2 | 0.20 | 0.14 | 94 | 0.7 | " | " | " | 9 |
| Sample 29 (Invention) | Center | — | | 330 | 4.8 | 0.21 | 0.23 | 87 | 1.3 | 108 | 150 | 3.5 | 20 |
| | Edge | 5 | | 300 | 4.9 | 0.25 | 0.28 | 86 | 1.4 | " | " | " | 20 |
| Sample 30 (Invention) | Center | — | | 100 | 19.8 | 0.27 | 0.28 | 86 | 1.4 | 96 | 70 | 2.5 | 25 |
| | Edge | 2 | | 120 | 8.0 | 0.25 | 0.27 | 85 | 1.5 | " | " | " | 25 |
| Sample 31 (Invention) | Center | — | | 120 | 8.2 | 0.16 | 0.18 | 85 | 1.5 | 124 | 10 | 1.0 | 34 |
| | Edge | 6 | | 150 | 5.7 | 0.18 | 0.20 | 84 | 1.6 | " | " | " | 33 |
| Sample 32 (Invention) | Center | — | | 80 | 12.1 | 0.03 | 0.03 | 75 | 1.7 | 138 | 40 | 2.0 | 20 |
| | Edge | 33 | | 100 | 9.8 | 0.05 | 0.04 | 73 | 1.9 | " | " | " | 20 |
| Comparative Sample 2 | Center | — | | 1500 | 1.1 | 0.39 | 0.39 | 90 | 1.0 | 111 | 24 | 1.0 | 38 |
| | Edge | 55 | | 2500 | 1.1 | 0.43 | 0.44 | 90 | 1.0 | 111 | " | 1.0 | 35 |

(3) Preparation and Evaluation of Light-Sensitive Material

The supports of the present invention and for comparison prepared above each was subjected to a surface treatment described in Example 1 of JP-A-8-57951 and after providing a back first layer, to a heat treatment (BTA treatment) at a temperature of (Tg of each support −5° C.) for a time period shown in Table 5. Thereafter, the core set curl and the calorie of the endothermic peak of 100 to 170° C. were measured and the results are shown in Table 5. Using these supports, light-sensitive materials were prepared in the same manner as Example 1 and evaluated in the same manner as in Example 1. The results obtained are shown in Tale 6. The edges and center part at the film formation were used as each sample, where the orientation angle was largest.

TABLE 6

(Preparation of Light-Sensitive Material and Evaluation of Cuttability)

| | | | Evaluation of Cuttability of Support | | | | | |
| --- | --- | --- | --- | --- | --- | --- | --- | --- |
| | | | Cuttability | | | | Perforability | |
| | | Slit Width, mm | Uncut-tability, % | Generation of Flash, % | Generation of Chips, % | Linearity of Cutting mm | Generation of Cleavage, % | Generation of Flash, % |
| Sample 21 | Center | 35 | 0 | 0 | 0 | 0 | 0 | 0 |
| (Invention) | Edge | 35 | 0 | 0 | 0 | 0 | 0 | 0 |
| Sample 22 | Center | 35 | 0 | 1 | 0 | 0 | 0 | 1 |
| (Invention) | Edge | 35 | 0 | 1 | 0 | 0 | 0 | 1 |
| Sample 23 | Center | 35 | 0 | 0 | 1 | 0 | 1 | 0 |
| (Invention) | Edge | 35 | 0 | 0 | 1 | 0 | 1 | 0 |
| Sample 24 | Center | 50 | 0 | 0 | 0 | 0 | 0 | 0 |
| (Invention) | Edge | 50 | 0 | 0 | 0 | 0 | 0 | 0 |
| Sample 25 | Center | 50 | 0 | 0 | 0 | 0 | 0 | 0 |
| (Invention) | Edge | 50 | 0 | 0 | 1 | 1 | 1 | 0 |
| Sample 26 | Center | 35 | 0 | 0 | 0 | 0 | 0 | 0 |
| (Invention) | Edge | 35 | 0 | 0 | 1 | 0 | 1 | 0 |
| Sample 27 | Center | 35 | 0 | 0 | 0 | 0 | 0 | 0 |
| (Invention) | Edge | 35 | 0 | 0 | 1 | 1 | 1 | 0 |
| Sample 28 | Center | 35 | 0 | 0 | 0 | 0 | 0 | 0 |
| (Invention) | Edge | 35 | 0 | 0 | 0 | 0 | 0 | 0 |
| Sample 29 | Center | 35 | 0 | 0 | 0 | 0 | 0 | 0 |
| (Invention) | Edge | 35 | 0 | 0 | 0 | 0 | 0 | 0 |
| Sample 30 | Center | 50 | 0 | 0 | 0 | 0 | 0 | 0 |
| (Invention) | Edge | 50 | 0 | 0 | 0 | 0 | 0 | 0 |
| Sample 31 | Center | 35 | 0 | 0 | 0 | 0 | 0 | 0 |
| (Invention) | Edge | 35 | 0 | 0 | 0 | 0 | 0 | 0 |
| Sample 32 | Center | 35 | 0 | 0 | 0 | 0 | 1 | 0 |
| (Invention) | Edge | 35 | 0 | 0 | 0 | 0 | 1 | 0 |
| Comparative | Center | 35 | 1 | 1 | 2 | 3 | 3 | 2 |
| Sample 2 | Edge | 35 | 2 | 4 | 5 | 5 | 7 | 5 |

| | | Kind of Light-Sensitive Material Provided | Evaluation of Cuttability of Light-Sensitive Material | | | | | | | |
| --- | --- | --- | --- | --- | --- | --- | --- | --- | --- | --- |
| | | | Cuttability | | | Perforability | | | | |
| | | | Uncut-tability, % | Generation of Flash, % | Generation of Chips, % | Linearity of Cutting mm | Generation of Cleavage, % | Generation of Flash, % | Coating Failure, /m² | Planeness Failure, mm |
| Sample 21 | Center | CN | 0 | 0 | 0 | 0 | 0 | 0 | } 0 | } 0 |
| (Invention) | Edge | CN | 0 | 0 | 0 | 0 | 0 | 0 | | |
| Sample 22 | Center | CR | 0 | 1 | 0 | 0 | 0 | 1 | } 0 | } 0 |
| (Invention) | Edge | CR | 0 | 1 | 0 | 0 | 0 | 1 | | |
| Sample 23 | Center | CN | 0 | 0 | 1 | 0 | 1 | 0 | } 0 | } 0 |
| (Invention) | Edge | CN | 0 | 0 | 1 | 0 | 1 | 0 | | |
| Sample 24 | Center | CN | 0 | 0 | 0 | 0 | 0 | 0 | } 0 | } 0 |
| (Invention) | Edge | CN | 0 | 0 | 0 | 0 | 0 | 0 | | |
| Sample 25 | Center | CR | 0 | 0 | 0 | 0 | 0 | 0 | } 0 | } 0 |
| (Invention) | Edge | CR | 0 | 0 | 1 | 1 | 1 | 0 | | |
| Sample 26 | Center | CN | 0 | 0 | 0 | 0 | 0 | 0 | } 0 | } 0 |
| (Invention) | Edge | CN | 0 | 0 | 1 | 0 | 1 | 0 | | |
| Sample 27 | Center | CN | 0 | 0 | 0 | 0 | 0 | 0 | } 0 | } 0 |
| (Invention) | Edge | CN | 0 | 0 | 1 | 1 | 1 | 0 | | |
| Sample 28 | Center | CN | 0 | 0 | 0 | 0 | 0 | 0 | } 0 | } 0 |
| (Invention) | Edge | CN | 0 | 0 | 0 | 0 | 0 | 0 | | |
| Sample 29 | Center | CN | 0 | 0 | 0 | 0 | 0 | 0 | } 0 | } 0 |
| (Invention) | Edge | CN | 0 | 0 | 0 | 0 | 0 | 0 | | |
| Sample 30 | Center | CR | 0 | 0 | 0 | 0 | 0 | 0 | } 0 | } 0 |
| (Invention) | Edge | CR | 0 | 0 | 0 | 0 | 0 | 0 | | |
| Sample 31 | Center | CN | 0 | 0 | 0 | 0 | 0 | 0 | } 0 | } 0 |
| (Invention) | Edge | CN | 0 | 0 | 0 | 0 | 0 | 0 | | |
| Sample 32 | Center | CR | 0 | 0 | 0 | 0 | 1 | 0 | } 0 | } 0 |

TABLE 6-continued (Preparation of Light-Sensitive Material and Evaluation of Cuttability)

| (Invention) | Edge | CR | 0 | 0 | 0 | 0 | 1 | 0 | | |
|---|---|---|---|---|---|---|---|---|---|---|
| Comparative | Center | CN | 2 | 2 | 3 | 5 | 5 | 4 | } 0 | } 0 |
| Sample 2 | Edge | CN | 4 | 6 | 7 | 7 | 9 | 7 | | |

EXAMPLE 3

(1) Preparation of Polyethylene Naphthalate-Type Support (1-1) Preparation of Support of the Present Invention (1-1-1) Polymerization of Polyethylene Naphthalate-Type Polymer

1) PEN

PEN was prepared. in the same manner as in Example 1.

2) Preparation of Polymer Blend (PB-1)

PET having an intrinsic viscosity of 0.58 prepared in a usual manner and the PEN prepared above were mixed at a weight ratio of 2:8, dried at 160° C. for 19 hours and then knead-extruded at 310° C. using a twin screw extruder.

3) Preparation of Copolymers (CP-9 and CP-21)

(a) CP-9

A mixture of dimethyl 2,6-naphthalenedicarboxylate:dimethyl adipate (80 parts:28 parts) was dispersed in ethylene glycol (58 parts) and thereto 0.029 part of manganese acetate tetatrahydrate, 0.028 part of antimony trioxide and 0.1% of spherical silica particles having an average particle size of 0.3 μm were added and heated at 200° C. with stirring. While removing the by-product methanol, the temperature was elevated to 235° C. After the production of by-product methanol was terminated, 0.03 part of trimethylphosphoric acid was added and reacted for 2 hours under reduced pressure of 0.3 Torr while elevating the temperature to 285° C. Thereto, the dyes Compound I-6 and Compound I-24 described in JP-A-7-168309 were added each in an amount of 54 ppm based on the solid contents. The polymer obtained had an intrinsic viscosity (in orthochlorophenol solvent, at 35° C.) of 0.63.

(b) CP-21

A mixture of dimethyl 2,6-naphthalenedicarboxylate; dimethyl adipate (90 parts:10 parts) was dispersed in a mixture of ethylene glycol:tetraethylene glycol (52 parts:18 parts), and thereto 0.029 part of manganese acetate tetrahydrate, 0.028 part of antimony trioxide and 0.1% of spherical silica particles having an average particle size of 0.3 μm were added and heated at 200° C. with stirring. While removing the by-product methanol, the temperature was elevated to 235° C. After the production of by-product methanol was terminated, 0.03 part of trimethylphosphoric acid was added and reacted for 2 hours under reduced pressure of 0.3 Torr while elevating the temperature to 285° C. Thereto, the dyes Compound I-6 and Compound I-24 described in JP-A-7-168309 were added each in an amount of 54 ppm based on the solid contents. The polymer obtained had an intrinsic viscosity (in orthochlorophenol solvent, at 35° C.) of 0.61.

(1-1-2) Film Formation of Polyethylene Naphthalate-Type Support

The polyethylene naphthalate-type polymer prepared above was formed into an unstretched film in the same manner as in Example 1.

The film obtained was subjected to pre-stage MD stretching, pre-heat treatment, TD stretching, after-heat treatment, post-stage MD stretching, heat setting and heat relaxation under the conditions shown in Table 7. Then, the film was gradually cooled under the conditions shown in Table 7. The total standard film width was 1.8 m and thereafter, by the trimming of both edges, the film width was reduced to 1.5 m. Furthermore, both edges were knurled to a height of 30 μm and a width of 10 mm and then, the film was taken up every 3,000 m around a core having a diameter of 30 cm. The thus-obtained supports had a thickness shown in Table 8.

(1-2) Preparation of Support For Comparison

PEN was prepared according to Example 1 of JP-A-10-293381 (shown in Table 7).

TABLE 7

| | | | MD Stretching | | | | Pre-Heating | |
|---|---|---|---|---|---|---|---|---|
| | | | 1st Stretching | | 2nd Stretching | | | |
| | Material | Tg (° C.) | Magnification | Temperature (° C.) | Magnification | Temperature (° C.) | Temperature (° C.) | Time (sec) |
| Sample 41 (Invention) | PEN | 119 | 1.1 | 130 | 1.2 | 135 | 125 | 35 |
| Sample 42 (Invention) | " | " | 1.05 | 125 | 1.05 | 130 | 111 | 3 |
| Sample 43 (Invention) | " | " | 1.2 | 130 | 1.6 | 130 | 148 | 178 |
| Sample 44 (Invention) | " | " | 1.1 | 140 | 1.1 | 145 | 135 | 60 |
| Sample 45 (Invention) | " | " | 1.8 | 120 | 1.2 | 125 | 120 | 20 |
| Sample 46 (Invention) | CP-2 | 105 | 1.3 | 120 | 1.1 | 115 | 115 | 120 |
| Sample 47 (Invention) | CP-4 | 110 | 1.6 | 115 | 1.3 | 120 | 111 | 150 |
| Sample 48 (Invention) | PEN | 119 | 1.1 | 125 | 1.2 | 125 | 130 | 45 |
| Sample 49 (Invention) | CP-9 | 105 | 1.05 | 115 | 1.1 | 115 | 135 | 90 |
| Sample 50 (Invention) | CP-21 | 110 | 1.2 | 120 | 1.1 | 130 | 125 | 70 |
| Sample 51 (Invention) | CP-9 | 105 | 1.1 | 110 | 1.1 | 115 | 140 | 100 |
| Sample 52 (Invention) | CP-21 | 110 | 1.2 | 130 | 2.0 | 125 | 120 | 15 |
| Sample 53 (Invention) | PEN | 119 | 1.2 | 135 | 1.3 | 135 | 125 | 30 |
| Sample 54 (Invention) | " | " | 1.1 | 150 | 1.1 | 145 | 130 | 10 |
| Sample 55 (Invention) | " | " | 1.05 | 135 | 1.15 | 140 | 115 | 160 |
| Sample 56 (Invention) | " | " | 1.1 | 135 | 1.2 | 135 | 148 | 8 |

TABLE 7-continued

| | | | | | | | | |
|---|---|---|---|---|---|---|---|---|
| Sample 57 (Invention) | CP-9 | 105 | 1.1 | 125 | 1.1 | 120 | 125 | 40 |
| Sample 58 (Invention) | CP-21 | 110 | 1.15 | 115 | 1.05 | 120 | 140 | 25 |
| Sample 59 (Invention) | PB-1 | 100 | 1.1 | 110 | 1.1 | 115 | 135 | 145 |
| Comparative Sample 3 | PEN | 119 | 1.0 | 105 | — | — | — | — |

| | TD Stretching | | | | | | |
|---|---|---|---|---|---|---|---|
| | | | | | Stretching Temperature | | |
| | 1st Stage Stretching Magnification | 2nd Stage Stretching Magnification | 3rd Stage Stretching Magnification | 4th Stage Stretching Magnification | Center (° C.) | Difference of Temperature Between Center and Both Edges (° C.) | Stretching Rate (%/sec) |
| Sample 41 (Invention) | 3 | 1.3 | — | — | 138 | 5 | 20 |
| Sample 42 (Invention) | 5.4 | 1.1 | — | — | 133 | 8 | 48 |
| Sample 43 (Invention) | 1.6 | 1.5 | 1.4 | 1.3 | 142 | 1 | 15 |
| Sample 44 (Invention) | 3.6 | 1.1 | — | — | 140 | 3 | 25 |
| Sample 45 (Invention) | 1.4 | 1.1 | — | — | 158 | 2 | 2 |
| Sample 46 (Invention) | 2.3 | 1.1 | — | — | 132 | 4 | 10 |
| Sample 47 (Invention) | 3.1 | 1.1 | — | — | 135 | 7 | 5 |
| Sample 48 (Invention) | 1.2 | 3.1 | — | — | 136 | 8 | 12 |
| Sample 49 (Invention) | 1.1 | 5.2 | — | — | 155 | 6 | 27 |
| Sample 50 (Invention) | 1.2 | 1.3 | 1.4 | 1.5 | 140 | 5 | 20 |
| Sample 51 (Invention) | 1.2 | 3.5 | — | — | 146 | 3 | 23 |
| Sample 52 (Invention) | 1.1 | 1.5 | — | — | 130 | 4 | 3 |
| Sample 53 (Invention) | 1.2 | 2.4 | — | — | 133 | 3 | 8 |
| Sample 54 (Invention) | 1.5 | 1.8 | — | — | 135 | 5 | 24 |
| Sample 55 (Invention) | 2.4 | 2.1 | — | — | 137 | 7 | 15 |
| Sample 56 (Invention) | 1.1 | 3.0 | 1.1 | — | 158 | 2 | 12 |
| Sample 57 (Invention) | 1.7 | 2.6 | — | — | 140 | 6 | 27 |
| Sample 58 (Invention) | 2.3 | 1.8 | — | — | 148 | 3 | 25 |
| Sample 59 (Invention) | 4.0 | — | — | — | 138 | 9 | 45 |
| Comparative Sample 3 | 3.0 | — | — | — | 135 | 0 | 70 |

| | Refractive Index Before Heat Setting | | | | | Heat Setting | | Heat Relaxation | | Gradual |
|---|---|---|---|---|---|---|---|---|---|---|
| | After-Heat Treatment | | | | $n_{MD} - n_{TD}$ | | | | | |
| | Temperature (° C.) | Time (sec) | Relaxation (%) | $n_{MD}$ | (difference of plane orientation) | $n_z$ | Temperature (° C.) | Time (sec) | Temperature (° C.) | Relaxation % | Cooling Rate (° C./sec) |
| Sample 41 (Invention) | 150 | 45 | 3 | 1.683 | −0.121 | 1.503 | 245 | 45 | 240 | 3 | −25 |
| Sample 42 (Invention) | 130 | 2 | 0 | 1.631 | −0.193 | 1.462 | 212 | 7 | 211 | 2 | −48 |
| Sample 43 (Invention) | 195 | 110 | 9 | 1.742 | −0.092 | 1.527 | 263 | 175 | 235 | 9 | −6 |
| Sample 44 (Inventipn) | 140 | 60 | 2 | 1.654 | −0.153 | 1.486 | 235 | 30 | 225 | 5 | −15 |
| Sample 45 (Invention) | 150 | 10 | 6 | 1.773 | −0.064 | 1.543 | 230 | 20 | 215 | 1 | −10 |
| Sample 46 (Invention) | 160 | 20 | 4 | 1.731 | −0.081 | 1.531 | 225 | 120 | 215 | 2 | −20 |
| Sample 47 (Invention) | 140 | 80 | 5 | 1.752 | −0.072 | 1.532 | 240 | 90 | 222 | 7 | −35 |
| Sample 48 (Invention) | 150 | 30 | 8 | 1.681 | −0.113 | 1.503 | 230 | 60 | 222 | 4 | −30 |
| Sample 49 (Invention) | 185 | 5 | 7 | 1.652 | −0.172 | 1.481 | 225 | 80 | 220 | 3 | −40 |
| Sample 50 (Invention) | 175 | 15 | 2 | 1.701 | −0.101 | 1.513 | 218 | 100 | 215 | 6 | −10 |
| Sample 51 (Invention) | 160 | 70 | 3 | 1.676 | −0.142 | 1.491 | 250 | 65 | 232 | 3 | −15 |
| Sample 52 (Invention) | 135 | 25 | 8 | 1.773 | −0.061 | 1.544 | 255 | 20 | 230 | 5 | −30 |
| Sample 53 (Invention) | 140 | 75 | 4 | 1.742 | −0.093 | 1.526 | 230 | 40 | 220 | 2 | −20 |
| Sample 54 (Invention) | 150 | 80 | 2 | 1.701 | −0.103 | 1.513 | 220 | 140 | 216 | 3 | −25 |
| Sample 55 (Invention) | 145 | 30 | 3 | 1.663 | −0.162 | 1.481 | 235 | 50 | 230 | 4 | −15 |
| Sample 56 (Invention) | 170 | 7 | 5 | 1.741 | −0.101 | 1.512 | 240 | 30 | 233 | 6 | −30 |
| Sample 57 (Invention) | 150 | 40 | 2 | 1.674 | −0.142 | 1.490 | 218 | 140 | 210 | 3 | −8 |
| Sample 58 (Invention) | 160 | 15 | 7 | 1.663 | −0.135 | 1.493 | 230 | 15 | 209 | 2 | −12 |
| Sample 59 (Invention) | 190 | 4 | 10 | 1.771 | −0.191 | 1.472 | 255 | 70 | 245 | 8 | −45 |
| Comparative Sample 3 | — | — | — | 1.590 | −0.220 | 1.421 | 170 | 30 | 170 | 5 | −60 |

(2) Evaluation of Support

The supports of the present invention and for comparison prepared above were evaluated by the above-described evaluation and measurement methods, and the results obtained are shown in Table 8 below.

TABLE 8

| | Thickness | | | Elongation at Break | | Break Strength | | Tear Strength | | Generation Ratio of Delamination | | Refractive Index | | | Heat Dimensional Change Ratio at 150° C. for 30 min. | |
|---|---|---|---|---|---|---|---|---|---|---|---|---|---|---|---|---|
| | | Unevenness | | | | | | | | | | | | | | |
| | Average (μm) | MD (μm) | TD (μm) | TD (%) | MD (%) | TD (kg/mm²) | MD (kg/mm²) | $S_{TD}$ (g) | $S_{MD}/S_{TD}$ | TD (%) | MD (%) | $n_{MD}$ | $n_{MD} - n_{TD}$ | $(n_{MD}+n_{TD}) \div 2 - n_z$ | MD (%) | TD (%) |
| Sample 41 (Invention) | 120 | 5 | 4 | 70 | 160 | 28 | 12 | 50 | 3.5 | 35 | 20 | 1.673 | -0.092 | 0.232 | 0.11 | 0.31 |
| Sample 42 (Invention) | 90 | 5 | 4 | 25 | 15 | 22 | 19 | 12 | 9.5 | 73 | 15 | 1.622 | -0.151 | 0.242 | 0.77 | 0.91 |
| Sample 43 (Invention) | 150 | 3 | 2 | 120 | 70 | 35 | 8 | 90 | 1.7 | 20 | 10 | 1.729 | -0.053 | 0.216 | 0.09 | 0.25 |
| Sample 44 (Invention) | 100 | 3 | 2 | 55 | 40 | 25 | 17 | 40 | 5.0 | 30 | 10 | 1.641 | -0.121 | 0.236 | 0.49 | 0.78 |
| Sample 45 (Invention) | 110 | 6 | 4 | 135 | 110 | 39 | 3 | 98 | 1.3 | 5 | 0 | 1.742 | -0.031 | 0.202 | 0.02 | 0.06 |
| Sample 46 (Invention) | 95 | 5 | 5 | 110 | 70 | 36 | 5 | 80 | 2.3 | 15 | 10 | 1.712 | -0.053 | 0.218 | 0.13 | 0.30 |
| Sample 47 (Invention) | 115 | 6 | 6 | 100 | 80 | 37 | 6 | 75 | 2.8 | 20 | 10 | 1.732 | -0.032 | 0.203 | 0.04 | 0.08 |
| Sample 48 (Invention) | 130 | 3 | 5 | 80 | 40 | 27 | 13 | 60 | 3.1 | 30 | 20 | 1.670 | -0.073 | 0.226 | 0.14 | 0.26 |
| Sample 49 (Invention) | 140 | 4 | 4 | 35 | 25 | 27 | 15 | 20 | 8.4 | 45 | 35 | 1.629 | -0.136 | 0.238 | 0.48 | 0.77 |
| Sample 50 (Invention) | 120 | 4 | 5 | 115 | 75 | 25 | 12 | 85 | 1.9 | 15 | 15 | 1.693 | -0.061 | 0.214 | 0.42 | 0.70 |
| Sample 51 (Invention) | 115 | 5 | 6 | 65 | 50 | 30 | 15 | 45 | 4.3 | 40 | 30 | 1.659 | -0.110 | 0.234 | 0.39 | 0.75 |
| Sample 52 (Invention) | 135 | 3 | 4 | 130 | 20 | 27 | 15 | 95 | 1.4 | 0 | 0 | 1.760 | -0.031 | 0.201 | 0.02 | 0.05 |
| Sample 53 (Invention) | 110 | 6 | 5 | 125 | 100 | 38 | 6 | 90 | 1.6 | 15 | 5 | 1.728 | -0.062 | 0.220 | 0.30 | 0.63 |
| Sample 54 (Invention) | 120 | 6 | 5 | 115 | 90 | 37 | 7 | 85 | 2.1 | 25 | 15 | 1.698 | -0.123 | 0.234 | 0.58 | 0.70 |
| Sample 55 (Invention) | 125 | 4 | 6 | 40 | 30 | 32 | 9 | 30 | 7.6 | 35 | 15 | 1.650 | -0.144 | 0.240 | 0.33 | 0.80 |
| Sample 56 (Invention) | 115 | 5 | 5 | 110 | 50 | 27 | 15 | 80 | 2.3 | 20 | 10 | 1.720 | -0.076 | 0.222 | 0.34 | 0.62 |
| Sample 57 (Invention) | 100 | 4 | 6 | 60 | 15 | 34 | 12 | 45 | 4.5 | 35 | 15 | 1.654 | -0.123 | 0.234 | 0.29 | 0.45 |
| Sample 58 (Invention) | 125 | 6 | 5 | 55 | 40 | 27 | 10 | 35 | 6.5 | 40 | 20 | 1.643 | -0.107 | 0.235 | 0.30 | 0.50 |
| Sample 59 (Invention) | 130 | 2 | 1 | 30 | 20 | 25 | 18 | 15 | 9.0 | 70 | 35 | 1.651 | -0.161 | 0.244 | 0.31 | 0.55 |
| Comparative Sample 3 | 105 | 10 | 12 | 15 | 200 | 37 | 7 | 5 | 15 | 95 | 35 | 1.605 | -0.18 | 0.195 | 1.10 | 1.52 |

TABLE 8-continued

| | Total Light Transmittance (%) | Haze (%) | Modulus $E_{MD}$ (kg/mm²) | Modulus $E_{TD}/E_{MD}$ | 150° C. Loss Modulus, tanδ | Heat of Crystal Fusion (J/g) | BTA Time (hour) | Endothermic Peak of 100 to 170° C. (J/g) | Core Set Curl (m⁻¹) |
|---|---|---|---|---|---|---|---|---|---|
| Sample 41 (Invention) | 92 | 0.3 | 380 | 2.0 | 0.10 | 48 | 12 | 2.2 | 62 |
| Sample 42 (Invention) | 98 | 0.1 | 220 | 5.8 | 0.42 | 40 | 0.1 | 0.6 | 88 |
| Sample 43 (Invention) | 95 | 0.2 | 430 | 1.8 | 0.08 | 59 | 470 | 4.3 | 30 |
| Sample 44 (Invention) | 93 | 0.3 | 260 | 4.5 | 0.35 | 50 | 24 | 2.4 | 63 |
| Sample 45 (Invention) | 72 | 1.9 | 530 | 1.5 | 0.08 | 46 | 1 | 1.2 | 70 |
| Sample 46 (Invention) | 88 | 1.0 | 400 | 2.3 | 0.12 | 45 | 3 | 1.7 | 65 |
| Sample 47 (Invention) | 86 | 1.2 | 530 | 1.9 | 0.09 | 53 | 6 | 2.0 | 63 |
| Sample 48 (Invention) | 90 | 0.5 | 400 | 2.5 | 0.14 | 43 | 40 | 2.7 | 56 |
| Sample 49 (Invention) | 93 | 0.2 | 210 | 5.3 | 0.39 | 42 | 10 | 2.1 | 63 |
| Sample 50 (Invention) | 86 | 0.7 | 390 | 3.0 | 0.30 | 41 | 0.5 | 0.9 | 81 |
| Sample 51 (Invention) | 83 | 1.4 | 270 | 3.8 | 0.33 | 56 | 24 | 2.2 | 63 |
| Sample 52 (Invention) | 77 | 1.7 | 540 | 1.3 | 0.06 | 53 | 3 | 1.6 | 66 |
| Sample 53 (Invention) | 85 | 1.3 | 420 | 2.7 | 0.17 | 46 | 10 | 1.9 | 64 |
| Sample 54 (Invention) | 87 | 1.2 | 250 | 5.4 | 0.39 | 49 | 80 | 3.0 | 50 |
| Sample 55 (Invention) | 94 | 0.2 | 240 | 5.3 | 0.39 | 52 | 50 | 2.8 | 45 |
| Sample 56 (Invention) | 92 | 0.3 | 380 | 3.0 | 0.31 | 47 | 200 | 3.7 | 37 |
| Sample 57 (Invention) | 94 | 0.4 | 250 | 4.3 | 0.35 | 45 | 100 | 3.2 | 40 |
| Sample 58 (Invention) | 91 | 0.5 | 270 | 4.8 | 0.40 | 50 | 150 | 3.5 | 38 |
| Sample 59 (Invention) | 80 | 1.6 | 200 | 4.3 | 0.34 | 58 | 300 | 4.0 | 33 |
| Comparative Sample 3 | 90 | 1.2 | 180 | 6.8 | 0.57 | 35 | 24 | 2.5 | 100 |

(3) Preparation of Light-Sensitive Material

Using the supports of the present invention and for comparison prepared above, light-sensitive materials were prepared in the same manner as in Example 1.

These light-sensitive materials with the support each was slit into a 135 light-sensitive material width (35 mm) or a brownie light-sensitive material width (60 mm) and then core set (wound around a core having a diameter of 11.5 mm and treated at 80° C. for 2 hours). Thereafter, the cuttability and perforability were evaluated by the above-mentioned methods, The results are shown in Table 9 below.

1) PEN

PEN was prepared in the same manner as in Example 1.

2) Preparation of Polymer Blend (PB-1)

PET having an intrinsic viscosity of 0.58 prepared in a usual manner and the PEN prepared above were mixed at a weight ratio of 2:8, dried at 160° C. for 19 hours and then knead-extruded at 310° C. using a twin screw extruder.

3) Preparation of Copolymers (CP-9 and CP-21)

(a) CP-9

CP-9 was prepared in the same manner as in Example 3.

(b) CP-21

CP-21 was prepared in the same manner as in Example 3.

TABLE 9

| | | Evaluation of Cuttability of Support | | | | | |
|---|---|---|---|---|---|---|---|
| | | Cuttability | | | Perforability | | |
| | Slit Width (mm) | Uncut-tability (%) | Generation of Flash (%) | Generation of Chips (%) | Generation of Cleavage (%) | Generation of Flash (%) | Generation of Cracks (%) |
| Sample 41 (Invention) | 35 | 0 | 0 | 0 | 0 | 0 | 0 |
| Sample 42 (Invention) | " | 0 | 0 | 1 | 1 | 0 | 0 |
| Sample 43 (Invention) | " | 0 | 0 | 0 | 0 | 1 | 0 |
| Sample 44 (Invention) | " | 0 | 0 | 0 | 0 | 0 | 0 |
| Sample 45 (Invention) | 60 | 0 | 1 | 0 | 0 | 1 | 0 |
| Sample 46 (Invention) | 35 | 0 | 0 | 0 | 0 | 1 | 0 |
| Sample 47 (Invention) | " | 0 | 1 | 0 | 0 | 1 | 0 |
| Sample 48 (Invention) | " | 0 | 0 | 0 | 1 | 0 | 0 |
| Sample 49 (Invention) | " | 0 | 0 | 0 | 0 | 0 | 0 |
| Sample 50 (Invention) | " | 0 | 0 | 0 | 0 | 0 | 0 |
| Sample 51 (Invention) | 60 | 0 | 1 | 0 | 0 | 1 | 0 |
| Sample 52 (Invention) | " | 0 | 0 | 0 | 0 | 0 | 0 |
| Sample 53 (Invention) | 35 | 0 | 0 | 0 | 0 | 0 | 0 |
| Sample 54 (Invention) | " | 0 | 0 | 0 | 0 | 0 | 0 |
| Sample 55 (Invention) | " | 0 | 0 | 0 | 0 | 0 | 0 |
| Sample 56 (Invention) | " | 0 | 0 | 0 | 0 | 0 | 0 |
| Sample 57 (Invention) | " | 0 | 0 | 0 | 0 | 0 | 0 |
| Sample 58 (Invention) | " | 0 | 0 | 0 | 0 | 0 | 0 |
| Sample 59 (Invention) | " | 0 | 0 | 1 | 1 | 0 | 0 |
| Comparative Sample 3 | 35 | 2 | 5 | 8 | 15 | 5 | 22 |

| | | Evaluation of Cuttability of Light-Sensitive Material | | | | | |
|---|---|---|---|---|---|---|---|
| | | Cuttability | | | Perforability | | |
| | Kind of Light-Sensitive Material Provided | Uncut-tability (%) | Generation of Flash (%) | Generation of Chips (%) | Generation of Cleavage (%) | Generation of Flash (%) | Generation of Cracks (%) |
| Sample 41 (Invention) | CN | 0 | 0 | 0 | 0 | 0 | 0 |
| Sample 42 (Invention) | " | 0 | 0 | 1 | 1 | 0 | 0 |
| Sample 43 (Invention) | " | 0 | 0 | 0 | 0 | 1 | 0 |
| Sample 44 (Invention) | " | 0 | 0 | 0 | 0 | 0 | 0 |
| Sample 45 (Invention) | CR | 0 | 1 | 0 | 0 | 1 | 0 |
| Sample 46 (Invention) | CN | 0 | 0 | 0 | 0 | 1 | 0 |
| Sample 47 (Invention) | " | 0 | 1 | 0 | 0 | 1 | 0 |
| Sample 48 (Invention) | CR | 0 | 0 | 0 | 1 | 0 | 0 |
| Sample 49 (Invention) | " | 0 | 0 | 0 | 0 | 0 | 0 |
| Sample 50 (Invention) | " | 0 | 0 | 0 | 0 | 0 | 0 |
| Sample 51 (Invention) | " | 0 | 1 | 0 | 0 | 1 | 0 |
| Sample 52 (Invention) | " | 0 | 0 | 0 | 0 | 0 | 0 |
| Sample 53 (Invention) | CN | 0 | 0 | 0 | 0 | 0 | 0 |
| Sample 54 (Invention) | " | 0 | 0 | 0 | 0 | 0 | 0 |
| Sample 55 (Invention) | " | 0 | 0 | 0 | 0 | 0 | 0 |
| Sample 56 (Invention) | CR | 0 | 0 | 0 | 0 | 0 | 0 |
| Sample 57 (Invention) | " | 0 | 0 | 0 | 0 | 0 | 0 |
| Sample 58 (Invention) | " | 0 | 0 | 0 | 0 | 0 | 0 |
| Sample 59 (Invention) | CN | 1 | 1 | 0 | 0 | 0 | 0 |
| Comparative Sample 3 | CN | 3 | 6 | 9 | 18 | 7 | 25 |

EXAMPLE 4

(1) Preparation of Polyester Support (1-1) Preparation of Support of the Present Invention (1-1-1) Polymerization of Polyester (1-1-2) Film Formation of Polyester Support The polyester prepared above was formed into pellets and therefrom, an unstretched film was prepared in the same manner as in Example 1.

The film obtained was subjected to pre-stage MD stretching, TD stretching and post-stage MD stretching under the conditions shown in Table 10. Then, the film was biaxially stretched at the same time under the conditions shown in Table 11. After the TD stretching or simultaneous biaxial stretching, the film was heat treated under the conditions shown in Tables 10 and 11.

The film was further heat set under the conditions shown in Tables 10 and 11.

The thus-obtained supports had a thickness shown in Tables 10 and 11. The total standard film width was 1.8 m and thereafter, by the trimming of both edges, the film width was reduced to 1.5 m. Furthermore, both edges were knurled to a height of 30 μm and a width of 10 mm and then, the film was taken up every 3,000 m around a core having a diameter of 30 cm.

(1-2) Preparation of Support For Comparison

PEN was prepared according to Example 1 of JP-A-10-293381.

TABLE 10

(Conditions for Film Formation of Support) (No. 1)

| | | | Formation of Unstretched Sheet | | Pre-Stage MD Stretching | | | | | |
|---|---|---|---|---|---|---|---|---|---|---|
| | | | | | First Stretching | | Second Stretching | | Stretching | Heat of Crystal |
| | Material | Tg (° C.) | Time Period Between T-C[a)] (sec) | Thickening Ratio of Both Edges[b)] | Magnification | Temperature (° C.) | Magnification | Temperature (° C.) | Rate (%/sec) | Fusion (J/g) |
| Sample 61 (Invention) | PEN | 119 | 7 | 7 | 1.3 | 125 | 1.6 | 130 | 100 | 42 |
| Sample 62 (Invention) | " | " | 14 | 28 | 1.1 | 120 | 2.7 | 140 | 290 | 58 |
| Sample 63 (Invention) | " | " | 3 | 3 | 1.1 | 130 | 1.3 | 132 | 10 | 31 |
| Sample 64 (Invention) | " | " | 5 | 12 | 2.5 | 121 | — | — | 60 | 35 |
| Sample 65 (Invention) | " | " | 10 | 18 | 1.1 | 135 | 1.2 | 138 | 150 | 40 |
| Sample 66 (Invention) | " | " | 12 | 23 | 1.8 | 123 | — | — | 200 | 47 |
| Sample 67 (Invention) | " | " | 9 | 5 | 1.1 | 130 | 1.3 | 132 | 170 | 43 |
| Sample 68 (Invention) | " | " | 8 | 9 | 2.0 | 133 | 1.1 | 135 | 50 | 38 |
| Sample 69 (Invention) | " | " | 6 | 14 | 1.6 | 138 | 1.8 | 140 | 240 | 53 |
| Sample 70 (Invention) | " | " | 4 | 20 | — | — | — | — | — | — |
| Sample 71 (Invention) | CP-9 | 105 | 6 | 8 | 1.2 | 125 | 1.3 | 127 | 120 | 36 |
| Sample 72 (Invention) | CP-9 | " | 8 | 12 | 1.4 | 128 | 1.7 | 130 | 90 | 39 |
| Sample 73 (Invention) | CP-21 | 110 | 7 | 17 | 1.2 | 124 | 1.6 | 133 | 40 | 35 |
| Sample 74 (Invention) | CP-21 | " | 9 | 11 | 1.5 | 120 | 1.5 | 123 | 100 | 42 |
| Sample 75 (Invention) | PB-1 | 100 | 5 | 16 | 1.1 | 127 | 2.1 | 129 | 260 | 40 |
| Comparative Sample 4 | PEN | 119 | 2 | 0 | 1.0 | 105 | — | — | — | 62 |

| | TD Stretching | | | | Heat-Treatment | | |
|---|---|---|---|---|---|---|---|
| | Total Stretching Magnification | 1st Stage Stretching Magnification | 2nd Stage Stretching Magnification | Temperature (° C.) | Temperature (° C.) | Time (sec) | Relaxation (%) |
| Sample 61 (Invention) | 4.2 | 1.6 | 2.6 | 135 | 170 | 20 | 3 |
| Sample 62 (Invention) | 4.8 | 1.2 | 4 | 157 | 190 | 2 | 0 |
| Sample 63 (Invention) | 3.1 | 1.6 | 1.9 | 133 | 140 | 45 | 9 |
| Sample 64 (Invention) | 3.8 | 2.2 | 1.7 | 122 | 125 | 110 | 5 |
| Sample 65 (Invention) | 4.5 | 1.5 | 3.0 | 145 | 150 | 30 | 7 |
| Sample 66 (Invention) | 4.3 | 3.3 | 1.2 | 140 | 160 | 8 | 1 |
| Sample 67 | 4.0 | 2.0 | 2.0 | 133 | 150 | 10 | 6 |

TABLE 10-continued (Conditions for Film Formation of Support) (No. 1)

| | | | | | | | |
|---|---|---|---|---|---|---|---|
| (Invention) Sample 68 | 3.9 | 1.9 | 2.1 | 150 | — | — | — |
| (Invention) Sample 69 | 4.6 | 3.1 | 1.5 | 148 | — | — | — |
| (Invention) Sample 70 | 3.5 | 1.8 | 1.9 | 138 | 165 | 15 | 2 |
| (Invention) Sample 71 | 3.9 | 1.3 | 3.0 | 133 | 145 | 60 | 4 |
| (Invention) Sample 72 | 4.2 | 1.4 | 3.0 | 136 | 155 | 15 | 3 |
| (Invention) Sample 73 | 4.0 | 1.7 | 2.4 | 139 | 165 | 10 | 1 |
| (Invention) Sample 74 | 3.8 | 2.9 | 1.3 | 134 | 155 | 20 | 0 |
| (Invention) Sample 75 | 3.7 | 2.2 | 1.7 | 139 | 145 | 75 | 2 |
| (Invention) Comparative Sample 4 | 3.0 | 1.6 | 1.9 | 135 | — | — | — |

| | Post-Stage MD Stretching | | | Heat-Setting | | |
|---|---|---|---|---|---|---|
| | Stretching Magnification | Temperature (° C.) | Stretching Rate (%/sec) | Temperature (° C.) | Time (sec) | Relaxation (%) |
| Sample 61 (Invention) | — | — | — | 245 | 31 | 3 |
| Sample 62 (Invention) | — | — | — | 260 | 6 | 1 |
| Sample 63 (Invention) | — | — | — | 215 | 175 | 9 |
| Sample 64 (Invention) | — | — | — | 230 | 45 | 6 |
| Sample 65 (Invention) | 1.2 | 155 | 280 | 225 | 15 | 7 |
| Sample 66 (Invention) | 2.6 | 124 | 31 | 235 | 35 | 0 |
| Sample 67 (Invention) | 2.1 | 135 | 160 | 220 | 20 | 5 |
| Sample 68 (Invention) | — | — | — | 245 | 40 | 7 |
| Sample 69 (Invention) | — | — | — | 250 | 50 | 8 |
| Sample 70 (Invention) | 1.7 | 145 | 100 | 225 | 40 | 8 |
| Sample 71 (Invention) | — | — | — | 210 | 120 | 6 |
| Sample 72 (Invention) | — | — | — | 230 | 145 | 0 |
| Sample 73 (Invention) | — | — | — | 220 | 90 | 3 |
| Sample 74 (Invention) | — | — | — | 235 | 10 | 7 |
| Sample 75 (Invention) | — | — | — | 220 | 40 | 3 |
| Comparative Sample 4 | — | — | — | 170 | 30 | 5 |

Note:
[a] passing time between T-die and casting drum
[b] Thickening Ratio (%) of Both Edges = (maximum thickness of both edges) − (thickness of center in TD/(thickness of center in TD) × 100

TABLE 11

(Conditions for Film Formation of Support) (No. 2)

| | | | Formation of Unstretched Sheet | | Simultaneous Biaxial Stretching | | | | | | | |
|---|---|---|---|---|---|---|---|---|---|---|---|---|
| | | | Time Period | Thickening | MD Stretching | | | | TD Stretching | | | |
| | Material | Tg (° C.) | Between T-C[a] (sec) | Ratio of Both Edges[b] | Total Magnification | 1st Stage | 2nd Stage | Stretching Rate (%/sec) | Magnification | 1st Stage | 2nd Stage | Stretching Rate (%/sec) |
| Sample 76 (Invention) | PEN | 119 | 11 | 18 | 1.5 | 1.1 | 1.4 | 40 | 3.5 | 1.4 | 2.5 | 100 |
| Sample 77 (Invention) | CP-9 | 105 | 4 | 12 | 2.0 | 1.3 | 1.5 | 75 | 4.0 | 2.0 | 2.0 | 150 |
| Sample 78 (Invention) | CP-21 | 110 | 7 | 8 | 2.5 | 2.1 | 1.2 | 50 | 4.3 | 1.5 | 2.9 | 80 |
| Sample 79 (Invention) | PB-1 | 100 | 14 | 28 | 1.2 | 1.1 | 1.1 | 75 | 4.5 | 3.5 | 1.3 | 280 |

| | Simultaneous Biaxial Stretching | | | | | | |
|---|---|---|---|---|---|---|---|
| | Stretching | Heat Treatment | | | Heat Setting | | |
| | Temperature (° C.) | Temperature (° C.) | Time (sec) | Relaxation (%) | Temperature (° C.) | Time (sec) | Relaxation (%) |
| Sample 76 (Invention) | 135 | 180 | 10 | 6 | 255 | 10 | 3 |
| Sample 77 (Invention) | 130 | 160 | 20 | 4 | 245 | 20 | 5 |
| Sample 78 (Invention) | 145 | 150 | 60 | 2 | 235 | 60 | 1 |
| Sample 79 (Invention) | 125 | 145 | 90 | 8 | 220 | 70 | 7 |

Note:
[a] passing time between T-die and casting drum
[b] Thickening Ratio (%) of Both Edges = (maximum thickness of both edges) − (thickness of center in TD/(thickness of ecnter in TD) × 100

(2) Evaluation of Support

The supports of the present invention and for comparison prepared above were evaluated and the results obtained are shown in Table 12 below.

TABLE 12

(Evaluation of Support)

| | Thickness | | | Tear | Generation Ratio of Delamination | | Elongation at Break | | Break Strength | | BTA Treatment |
|---|---|---|---|---|---|---|---|---|---|---|---|
| | Average, μm | Unevenness MD, μm | TD, μm | Strength TD, g | MD/TD | TD, % | MD, % | TD, % | MD, % | TD, Kg/mm² | MD, Kg/mm² | Time, hours |
| Sample 61 (Invention) | 120 | 2 | 3 | 40 | 2.5 | 30 | 20 | 70 | 50 | 20 | 12 | 3 |
| Sample 62 (Invention) | 100 | 1 | 1 | 60 | 1.8 | 20 | 15 | 40 | 30 | 15 | 7 | 1 |
| Sample 63 (Invention) | 110 | 4 | 5 | 70 | 1.6 | 15 | 10 | 80 | 40 | 22 | 10 | 100 |
| Sample 64 (Invention) | 90 | 8 | 6 | 50 | 2.0 | 20 | 18 | 60 | 50 | 18 | 10 | 70 |
| Sample 65 (Invention) | 105 | 3 | 3 | 70 | 1.8 | 15 | 20 | 100 | 70 | 25 | 15 | 10 |
| Sample 66 (Invention) | 150 | 8 | 5 | 80 | 1.6 | 10 | 15 | 110 | 90 | 33 | 16 | 200 |
| Sample 67 (Invention) | 130 | 2 | 1 | 90 | 1.4 | 0 | 0 | 130 | 14 | 30 | 25 | 0.1 |
| Sample 68 (Invention) | 115 | 5 | 8 | 55 | 2.3 | 25 | 15 | 75 | 40 | 15 | 14 | 0.3 |
| Sample 69 (Invention) | 125 | 4 | 7 | 45 | 1.8 | 35 | 30 | 60 | 30 | 27 | 15 | 24 |
| Sample 70 (Invention) | 100 | 3 | 3 | 55 | 3.3 | 25 | 20 | 80 | 60 | 24 | 12 | 18 |
| Sample 71 (Invention) | 115 | 3 | 2 | 25 | 4.2 | 60 | 30 | 40 | 30 | 12 | 8 | 30 |
| Sample 72 (Invention) | 125 | 2 | 4 | 15 | 3.8 | 70 | 35 | 35 | 25 | 17 | 12 | 12 |
| Sample 73 (Invention) | 120 | 3 | 3 | 20 | 5.0 | 65 | 15 | 30 | 20 | 24 | 18 | 150 |
| Sample 74 (Invention) | 130 | 1 | 2 | 20 | 6.1 | 65 | 10 | 25 | 20 | 23 | 18 | 350 |
| Sample 75 (Invention) | 135 | 4 | 2 | 75 | 1.5 | 5 | 10 | 90 | 70 | 20 | 12 | 480 |
| Sample 76 (Invention) | 110 | 5 | 6 | 10 | 9.5 | 75 | 30 | 25 | 20 | 38 | 2 | 8 |
| Sample 77 (Invention) | 100 | 4 | 5 | 15 | 8.5 | 70 | 20 | 30 | 20 | 30 | 3 | 35 |
| Sample 78 (Invention) | 125 | 4 | 4 | 20 | 8.0 | 60 | 15 | 30 | 20 | 33 | 3 | 0.8 |
| Sample 79 (Invention) | 130 | 5 | 3 | 25 | 7.5 | 55 | 10 | 35 | 25 | 24 | 12 | 6 |
| Comparative Sample 4 | 105 | 10 | 12 | 5 | 15 | 90 | 55 | 15 | 3 | 42 | 35 | 24 |

TABLE 12-continued (Evaluation of Support)

| | Core Set Curl | | | | Endothermic Peak of 100 to 170° C., J/g | Total | | | Modulus | | Heat of Crystal Fusion J/g |
|---|---|---|---|---|---|---|---|---|---|---|---|
| | Before BTA | | After BTA | | | Orientation Angle, degree (°) | Light Transmittance, % | Haze, % | | | |
| | MD m$^{-1}$ | MD/TD m$^{-1}$ | MD m$^{-1}$ | MD/TD m$^{-1}$ | | | | | MD, kg/mm$^2$ | TD, kg/mm$^2$ | |
| Sample 61 (Invention) | 80 | 0.60 | 40 | 0.60 | 1.8 | 20 | 92 | 0.5 | 450 | 800 | 48 |
| Sample 62 (Invention) | 65 | 0.40 | 45 | 0.50 | 1.6 | 30 | 80 | 1.5 | 350 | 1000 | 57 |
| Sample 63 (Invention) | 105 | 0.45 | 35 | 0.40 | 3.2 | 10 | 96 | 0.1 | 500 | 650 | 43 |
| Sample 64 (Invention) | 70 | 0.50 | 32 | 0.45 | 2.8 | 25 | 89 | 0.9 | 400 | 900 | 48 |
| Sample 65 (Invention) | 100 | 0.75 | 75 | 0.75 | 2.0 | 18 | 91 | 0.4 | 300 | 1000 | 59 |
| Sample 66 (Invention) | 120 | 0.85 | 50 | 0.80 | 3.8 | 25 | 94 | 0.3 | 400 | 850 | 46 |
| Sample 67 (Invention) | 135 | 0.95 | 120 | 0.90 | 0.6 | 15 | 93 | 0.2 | 350 | 950 | 44 |
| Sample 68 (Invention) | 75 | 0.45 | 60 | 0.50 | 0.8 | 34 | 90 | 0.7 | 400 | 550 | 40 |
| Sample 69 (Invention) | 70 | 0.40 | 38 | 0.45 | 2.3 | 38 | 72 | 1.8 | 380 | 600 | 41 |
| Sample 70 (Invention) | 85 | 0.60 | 56 | 0.60 | 2.1 | 25 | 85 | 1.1 | 450 | 750 | 43 |
| Sample 71 (Invention) | 120 | 0.65 | 65 | 0.60 | 2.5 | 15 | 89 | 0.8 | 250 | 330 | 40 |
| Sample 72 (Invention) | 125 | 0.70 | 70 | 0.75 | 2.3 | 20 | 91 | 0.5 | 300 | 450 | 40 |
| Sample 73 (Invention) | 130 | 0.75 | 40 | 0.75 | 3.8 | 20 | 93 | 0.3 | 380 | 550 | 41 |
| Sample 74 (Invention) | 135 | 0.70 | 50 | 0.70 | 4.7 | 25 | 92 | 0.4 | 330 | 550 | 43 |
| Sample 75 (Invention) | 140 | 0.80 | 45 | 0.85 | 4.9 | 18 | 92 | 0.4 | 280 | 430 | 43 |
| Sample 76 (Invention) | 60 | 0.30 | 40 | 0.35 | 2.5 | 5 | 93 | 0.3 | 400 | 900 | 49 |
| Sample 77 (Invention) | 65 | 0.35 | 35 | 0.35 | 2.9 | 3 | 95 | 0.2 | 350 | 800 | 47 |
| Sample 78 (Invention) | 70 | 0.35 | 55 | 0.40 | 1.0 | 7 | 90 | 0.6 | 550 | 1100 | 59 |
| Sample 79 (Invention) | 75 | 0.45 | 40 | 0.45 | 1.8 | 8 | 89 | 0.7 | 430 | 700 | 46 |
| Comparative Sample 4 | 145 | 0.95 | 100 | 0.90 | 2.5 | 45 | 96 | 1.2 | 130 | 680 | 33 |

(3) Preparation of Light-Sensitive Material

Using the supports of the present invention and for comparison prepared above, light-sensitive materials were prepared in the same manner as Example 1. These light-sensitive materials with the support each was slit into a 135 light-sensitive material width (35 mm) or a brownie light-sensitive material width (60 mm) and then core set (wound around a core having a diameter of 11.5 mm and treated at 80° C. for 2 hours). Thereafter, the cuttability was evaluated by the above-mentioned method. The results are shown in Table 13 below. The samples prepared by cutting the edges at the film formation where the orientation angle was largest in the machine direction were used.

TABLE 13

(Preparation of Light-Sensitive Material and Evaluation of Cuttability)

| | Slit Width, mm | Uncuttability, % | Generation of Flash, % | Generation of Chips, % | Linearity of Cutting, mm |
|---|---|---|---|---|---|
| | | Evaluation of Cuttability of Support | | | |
| | | Cuttability | | | |
| Sample 61 (Invention) | 35 | 0 | 0 | 0 | 0 |
| Sample 62 (Invention) | 35 | 0 | 0 | 0 | 0.6 |
| Sample 63 (Invention) | 60 | 0 | 0 | 0 | 0.3 |
| Sample 64 (Invention) | 35 | 0 | 0 | 0 | 1.0 |
| Sample 65 (Invention) | 60 | 0 | 0 | 1 | 0.2 |
| Sample 66 (Invention) | 35 | 0 | 0 | 1 | 0.8 |
| Sample 67 (Invention) | 35 | 0 | 1 | 1 | 0.4 |
| Sample 68 (Invention) | 35 | 0 | 0 | 0 | 1.8 |
| Sample 69 (Invention) | 35 | 0 | 0 | 0 | 1.5 |
| Sample 70 (Invention) | 35 | 0 | 0 | 0 | 0.5 |
| Sample 71 (Invention) | 35 | 0 | 0 | 0 | 0 |
| Sample 72 (Invention) | 35 | 0 | 0 | 0 | 0.1 |
| Sample 73 (Invention) | 60 | 0 | 0 | 0 | 0.2 |
| Sample 74 (Invention) | 35 | 0 | 0 | 0 | 0 |
| Sample 75 (Invention) | 35 | 0 | 0 | 1 | 1.3 |
| Sample 76 (Invention) | 35 | 0 | 0 | 0 | 0.7 |
| Sample 77 (Invention) | 35 | 0 | 0 | 0 | 0.6 |
| Sample 78 (Invention) | 60 | 0 | 0 | 0 | 0.4 |
| Sample 79 (Invention) | 60 | 0 | 0 | 0 | 0.5 |
| Comparative Sample 4 | 35 | 2 | 5 | 8 | 2.7 |

TABLE 13-continued (Preparation of Light-Sensitive Material and Evaluation of Cuttability)

|  | Kind of Light-Sensitive Material Provided | Uncuttability, % | Generation of Flash, % | Generation of Chips, % | Linearity of Cutting, mm |
|---|---|---|---|---|---|
|  |  | Evaluation of Cuttability of Light-Sensitive Material |||| 
|  |  | Perforability ||||
| Sample 61 (Invention) | CN | 0 | 0 | 0 | 0 |
| Sample 62 (Invention) | CR | 0 | 0 | 0 | 0.5 |
| Sample 63 (Invention) | CR | 0 | 0 | 0 | 0.3 |
| Sample 64 (Invention) | CN | 0 | 0 | 0 | 1.1 |
| Sample 65 (Invention) | CN | 0 | 0 | 1 | 0.3 |
| Sample 66 (Invention) | CR | 0 | 0 | 1 | 0.7 |
| Sample 67 (Invention) | CN | 0 | 1 | 1 | 0.5 |
| Sample 68 (Invention) | CN | 0 | 0 | 0 | 1.9 |
| Sample 69 (Invention) | CN | 0 | 0 | 0 | 1.4 |
| Sample 70 (Invention) | CN | 0 | 0 | 0 | 0.6 |
| Sample 71 (Invention) | CN | 0 | 0 | 0 | 0 |
| Sample 72 (Invention) | CR | 0 | 0 | 0 | 0.1 |
| Sample 73 (Invention) | CR | 0 | 0 | 0 | 0.3 |
| Sample 74 (Invention) | CN | 0 | 0 | 0 | 0 |
| Sample 75 (Invention) | CR | 0 | 0 | 1 | 1.4 |
| Sample 76 (Invention) | CN | 0 | 0 | 0 | 0.8 |
| Sample 77 (Invention) | CR | 0 | 0 | 0 | 0.5 |
| Sample 78 (Invention) | CR | 0 | 0 | 0 | 0.4 |
| Sample 79 (Invention) | CN | 0 | 0 | 0 | 0.3 |
| Comparative Sample 4 | CN | 3 | 6 | 9 | 2.9 |

As is apparent from the results in Table 13, the support and light-sensitive material samples according to the present invention exhibited excellent properties with both in the cutt,ability and the cutting linearity as compared with the sample for comparison.

While the invention has been described in detail and with reference to specific embodiments thereof, it will be apparent to one skilled in the art that various changes and modifications can be made therein without departing from the spirit and scope thereof.

What is claimed is:

1. A polyester support having a tear strength in the transverse direction (TD) of 10 to 100 g, a break strength in TD of 10 to 40 Kg/mm$^2$, a break strength in the machine direction (MD) of 2 to 25 Kg/mm$^2$ and a thickness unevenness in MD of 0 to 8 µm.

2. The polyester support as claimed in claim 1, wherein the elongation at break in TD is from 20 to 140% and the elongation at break in MD is from 10 to 180%.

3. The polyester support as claimed in claim 1, wherein the tear strength ratio between MD and TD (MD/TD) is from 1.2 to 10.

4. The polyester support as claimed in claim 1 or 2, wherein the core set curl in MD is from 30 to 140 m$^{-1}$.

5. The polyester support as claimed in claim 1, wherein the thickness unevenness in TD is from 0 to 8 µm.

6. The polyester support as claimed in claim 1, wherein the generation ratio of delamination is from 0 to 75% each in TD and MD.

7. The polyester support as claimed in claim 1, wherein the ratio of modulus between TD and MD (MD/TD) is from 1.2 to 6.

8. The polyester support as claimed in claim 1, wherein the ratio of elongation at break between MD and TD (TD/MD) is from 1.2 to 10.

9. The polyester support as claimed in claim 1, wherein the total light transmittance is from 70 to 98%, the haze is from 0 to 2% and the thickness is from 90 to 150 µm.

10. The polyester support as claimed in claim 1, which consists of a dicarboxylic acid residue comprising from 65 to 95 mol % of a naphthalene dicarboxylic acid residue and from 5 to 35 mol % of an aliphatic and/or aromatic dicarboxylic acid residue having from 3 to 15 carbon atoms, and a diol residue comprising from 65 to 100 mol % of an ethylene glycol residue and from 0 to 35 mol % of a HO—{(CH$_2$)$_n$O}$_m$—H (wherein n is an integer of 3 to 6 and m is an integer of 2 to 30) and/or H—(OCH$_2$CH$_2$)$_n$—O—B—R—B—O(CH$_2$CH$_2$O)$_m$—H (wherein n and m, which may be the same or different, each is an integer of 1 to 3, R represents —O—, —S—, —CH$_2$— or —C(CH$_3$)$_2$—, and B represents a benzene ring) residue.

11. The polyester support as claimed in claim 1, which is sequentially stretched in MD to from 1.0 to 3.0 times and in TD to from 3.0 to 5.0 times and then heat set to have a heat of crystal fusion of 30 to 60 J/g.

12. The polyester support as claimed in claim 1, which is heat-treated at a temperature in the range from 50° C. to the glass transition temperature (Tg) of said polyester.

13. A rolled silver halide photographic light-sensitive material using the support of claim 1 and wound along MD.

* * * * *